US012806906B2

(12) United States Patent
Kawamata

(10) Patent No.: US 12,806,906 B2
(45) **Date of Patent: *Nov. 24, 2026**

(54) PRINTER, CONTROL METHOD, AND NON-TRANSITORY COMPUTER-READABLE MEDIUM STORING COMPUTER-READABLE INSTRUCTIONS

(71) Applicant: BROTHER KOGYO KABUSHIKI KAISHA, Nagoya (JP)

(72) Inventor: Noriyuki Kawamata, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 135 days.

This patent is subject to a terminal disclaimer.

(21) Appl. No.: 18/824,172

(22) Filed: Sep. 4, 2024

(65) Prior Publication Data

US 2024/0424794 A1 Dec. 26, 2024

Related U.S. Application Data

(63) Continuation of application No. 17/703,011, filed on Mar. 24, 2022, now Pat. No. 12,109,816.

(30) Foreign Application Priority Data

May 31, 2021 (JP) ................................ 2021-091863

(51) Int. Cl.
*B41J 2/165* (2006.01)

(52) U.S. Cl.
CPC ......... *B41J 2/1652* (2013.01); *B41J 2/16508* (2013.01); *B41J 2/16523* (2013.01)

(58) Field of Classification Search
CPC ... B41J 2/1652; B41J 2/16508; B41J 2/16523
See application file for complete search history.

(56) References Cited

U.S. PATENT DOCUMENTS 11,141,977 B2 * 10/2021 Sawada ................ B41J 2/16541
12,043,034 B2 * 7/2024 Ishikawa ................ B41J 2/1652
(Continued)

FOREIGN PATENT DOCUMENTS

CN 101376287 A 3/2009
DE 102009034237 A1 2/2010
(Continued)

*Primary Examiner* — Sharon Polk
(74) *Attorney, Agent, or Firm* — HOGAN LOVELLS CADWALADER US LLP

(57) ABSTRACT

A printer includes a head, a flushing receiving member, a cap, and a processor. The head is provided with a nozzle surface intersecting a discharge direction and configured to move in a main scanning direction. The flushing receiving member is positioned in the discharge direction with respect to a movement path of the head in the main scanning direction. The cap is configured to closely adhere to the nozzle surface. The cap and the flushing receiving member are arranged in the main scanning direction. The processor performs flushing processing including a first flushing operation of discharging ink from the head toward the cap, and a second flushing operation of discharging the ink toward the flushing receiving member and print processing, after the flushing processing, of discharging the ink from the head onto the print medium while moving the head in the main scanning direction.

8 Claims, 16 Drawing Sheets

(56) References Cited

U.S. PATENT DOCUMENTS

| | | | |
|---|---|---|---|
| 12,109,816 B2 * | 10/2024 | Kawamata | B41J 2/16547 |
| 2001/0020962 A1 | 9/2001 | Kanaya et al. | |
| 2004/0212656 A1 | 10/2004 | Waller et al. | |
| 2008/0143778 A1 * | 6/2008 | Sugiyama | B41J 2/16508 347/23 |
| 2012/0026230 A1 | 2/2012 | Danzuka et al. | |
| 2012/0229565 A1 | 9/2012 | Yuda et al. | |
| 2015/0091976 A1 | 4/2015 | Mizutani | |
| 2015/0266298 A1 | 9/2015 | Kifuku | |
| 2018/0029370 A1 | 2/2018 | Fujikawa et al. | |
| 2021/0339531 A1 | 11/2021 | Arakane et al. | |

FOREIGN PATENT DOCUMENTS

| | | | |
|---|---|---|---|
| JP | 2001180007 | A | 7/2001 |
| JP | 2003237109 | A | 8/2003 |
| JP | 2004284084 | A | 10/2004 |
| JP | 3707274 | B2 | 10/2005 |
| JP | 2005343151 | A | 12/2005 |
| JP | 2010184502 | A | 8/2010 |
| JP | 2011042047 | A | 3/2011 |
| JP | 2012030511 | A | 2/2012 |
| JP | 2012183740 | A | 9/2012 |
| JP | 2012240237 | A | 12/2012 |
| JP | 2014024184 | A | 2/2014 |
| JP | 2018020461 | A | 2/2018 |
| JP | 6318747 | B2 | 5/2018 |
| JP | 2021030520 | A | 3/2021 |

* cited by examiner

PRINTER, CONTROL METHOD, AND NON-TRANSITORY COMPUTER-READABLE MEDIUM STORING COMPUTER-READABLE INSTRUCTIONS

REFERENCE TO RELATED APPLICATIONS

The present application is a continuation of U.S. patent application Ser. No. 17/703,011, filed on Mar. 24, 2022, which application claims priority to Japanese Patent Application No. 2021-091863 filed May 31, 2021. The contents of the foregoing application are hereby incorporated herein by reference.

BACKGROUND ART

The present disclosure relates to a printer, a control method, and a non-transitory computer-readable medium storing computer-readable instructions.

A printer is provided with a recording head and a flushing box. The recording head is able to move in a main scanning direction, and performs printing on a print medium by discharging ink onto the print medium. The flushing box is provided below a movement path of the recording head, and receives the ink discharged from the recording head by a discharge flushing operation. The printer causes the ink to be discharged from the recording head toward the flushing box, by performing the discharge flushing operation by the recording head while moving the recording head in the main scanning direction.

SUMMARY

In the above-described printer, since the discharge flushing operation is performed while the recording head is moving over the flushing box, the time period over which the recording head passes over the flushing box during the flushing operation is limited. Thus, for example, when there is a large quantity of the ink to be discharged from the recording head by the discharge flushing operation, or when the movement of the recording head is fast, there is a possibility that the ink discharged from the recording head by the discharge flushing operation may land outside the flushing box.

Embodiments of the broad principles derived herein provide a printer, a control method, and a non-transitory computer-readable medium storing computer-readable instructions capable of reducing a possibility of ink discharged from a head by a discharge flushing operation landing outside a flushing receiving member.

A first aspect of the present disclosure relates to a printer. The printer includes a head, a flushing receiving member, a cap, a processor, and a memory. The head is provided with a nozzle surface intersecting a discharge direction. The head is configured to print an image on a print medium by discharging ink onto the print medium and is configured to move in a main scanning direction intersecting the discharge direction. The flushing receiving member is positioned in the discharge direction with respect to a movement path of the head in the main scanning direction. The flushing receiving member is a member different from the print medium. The cap is configured to closely adhere to the nozzle surface. The cap and the flushing receiving member are arranged in the main scanning direction. The memory stores computer-readable instructions that, when executed by the processor, instruct the processor to perform processes. The processes include performing flushing processing including a first flushing operation of discharging the ink from the head toward the cap, and a second flushing operation of discharging the ink toward the flushing receiving member, and performing print processing, after the flushing processing, of discharging the ink from the head onto the print medium while moving the head in the main scanning direction.

According to the first aspect, in addition to the second flushing operation, the ink is also discharged from the head in the first flushing operation. Thus, the printer can reduce a possibility of the ink discharged from the head by the second flushing operation landing outside the flushing receiving member.

A second aspect of the present disclosure relates to a control method of a printer including a head, a flushing receiving member, and a cap. The head is provided with a nozzle surface intersecting a discharge direction. The head is configured to print an image on a print medium by discharging ink onto the print medium and is configured to move in a main scanning direction intersecting the discharge direction. The flushing receiving member is positioned in the discharge direction with respect to a movement path of the head in the main scanning direction. The flushing receiving member is a member different from the print medium. The cap is configured to closely adhere to the nozzle surface. The cap and the flushing receiving member are arranged in the main scanning direction. The control method includes performing flushing processing including a first flushing operation of discharging the ink from the head toward the cap, and a second flushing operation of discharging the ink toward the flushing receiving member, and performing print processing, after the flushing processing, of discharging the ink from the head onto the print medium while moving the head in the main scanning direction.

The second aspect can achieve the same effects as those of the first aspect.

A third aspect of the present disclosure relates to a non-transitory computer-readable medium storing computer-readable instructions that, when executed by a computer of a printer, cause the computer to perform processes. The printer includes a head, a flushing receiving member, and a cap. The head is provided with a nozzle surface intersecting a discharge direction. The head is configured to print an image on a print medium by discharging ink onto the print medium and is configured to move in a main scanning direction intersecting the discharge direction. The flushing receiving member is positioned in the discharge direction with respect to a movement path of the head in the main scanning direction. The flushing receiving member is a member different from the print medium. The cap is configured to closely adhere to the nozzle surface. The cap and the flushing receiving member are arranged in the main scanning direction. The processes include performing flushing processing including a first flushing operation of discharging the ink from the head toward the cap, and a second flushing operation of discharging the ink toward the flushing receiving member, and performing print processing, after the flushing processing, of discharging the ink from the head onto the print medium while moving the head in the main scanning direction.

The third aspect can achieve the same effects as those of the first aspect.

BRIEF DESCRIPTION OF DRAWINGS

Embodiments will be described below in detail with reference to the accompanying drawings in which.

DESCRIPTION

Figure 1:
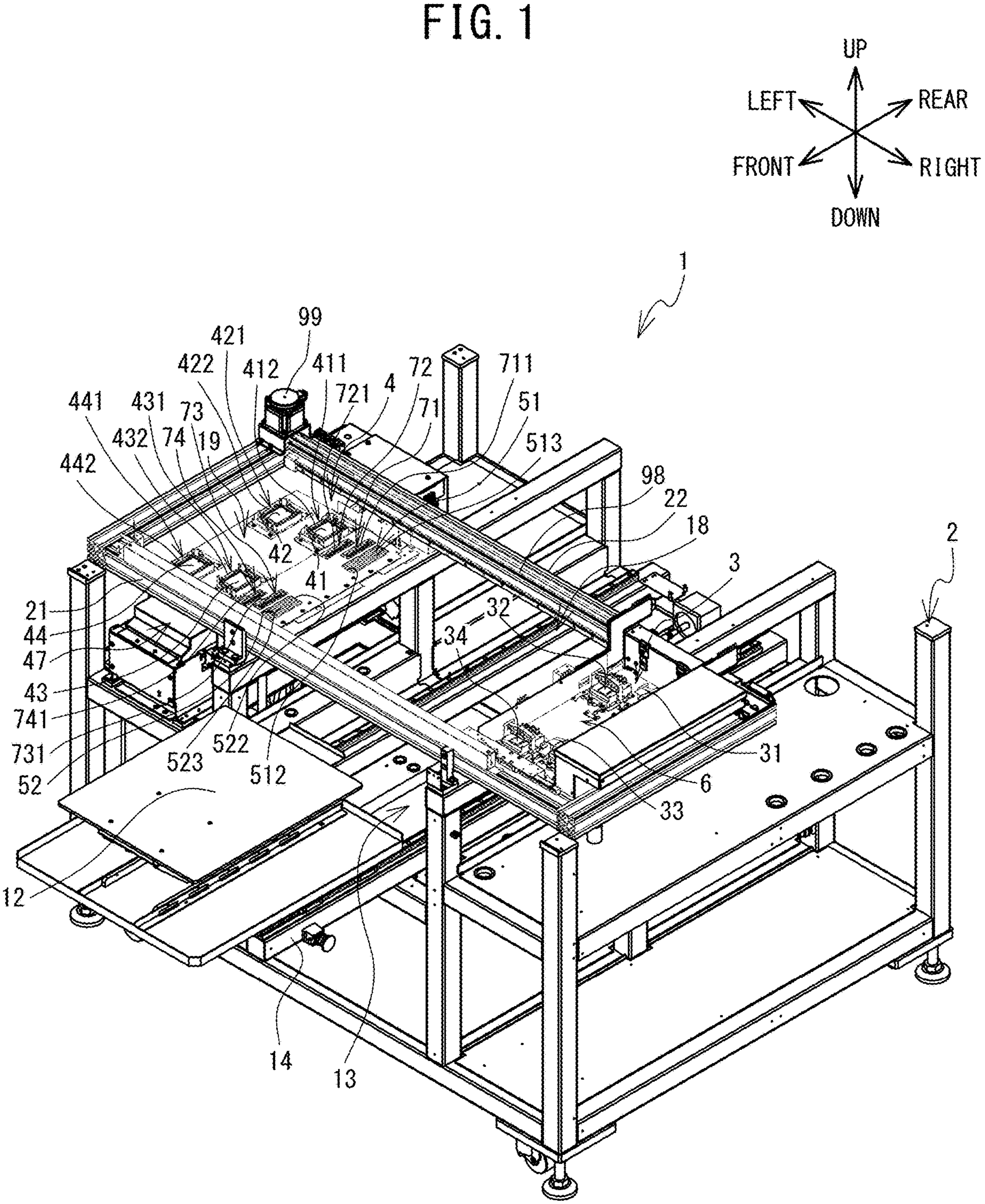
FIG. 1 is a perspective view of a printer.

A printer 1 related to one embodiment of the present disclosure will be described with reference to the drawings. The directions of up, down, lower left, upper right, lower right, and upper left in FIG. 1 correspond to the upper side, lower side, front, rear, right, and left, respectively, of the printer 1. The up-down direction in FIG. 1 is the vertical direction. In the present embodiment, the mechanical elements in the drawings are shown at actual scale.

The printer 1 shown in FIG. 1 is an inkjet printer, and performs printing by discharging ink onto a print medium M shown in FIG. 5 to FIG. 11. The print medium M is a cloth, paper, or the like, and is a T-shirt, for example. The printer 1 can print a color image on the print medium M using five colors of ink, i.e., white, black, yellow, cyan, and magenta.

Hereinafter, of the five colors of ink, the white-colored ink will be referred to as "white ink". When collectively referring to, of the five colors of ink, the other four colors of ink, i.e., black, cyan, yellow, and magenta, or when neither is specified, they will be referred to as "color ink". When collectively referring to the white ink and the color ink, or when neither is specified, they will simply be referred to as "ink". The white ink is used for printing as a white part of an image or as a base for the color ink. The color ink is used for printing a color image and is discharged directly onto the print medium M or onto a base of white ink.

Figure 2:
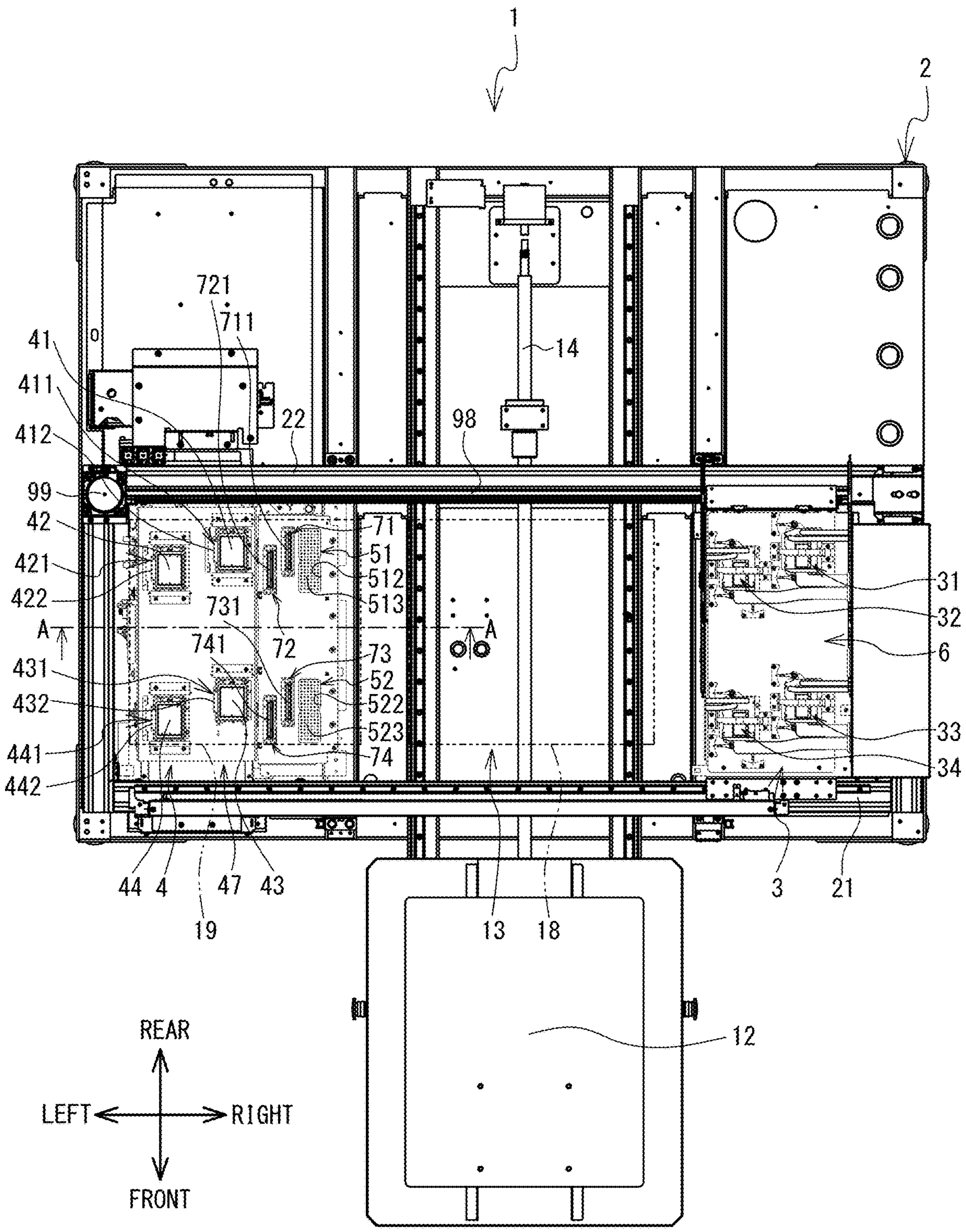
FIG. 2 is a plan view of the printer.

A mechanical configuration of the printer 1 will be explained with reference to FIG. 1 to FIG. 11. As shown in FIG. 1 and FIG. 2, the printer 1 is provided with a frame body 2, and a platen 12. The frame body 2 is configured in a lattice shape by a plurality of shafts extending in the front-rear direction, the left-right direction, and the up-down direction. An opening 13 is formed in the frame body 2. The opening 13 is positioned in a central portion of the frame body 2 in a front view, and extends from the front end of the frame body 2 toward the rear. The platen 12 is disposed inside the opening 13 in a front view. The platen 12 has a plate shape, and extends in the front-rear direction and the left-right direction. The platen 12 is supported, from below, by a support portion 14. The support portion 14 is fixed to the frame body 2 inside the opening 13. The support portion 14 is a shaft, and extends in the front-rear direction. The platen 12 moves in the front-rear direction along the support portion 14 as a result of being driven by a sub-scanning motor 97 shown in FIG. 12. Thus, the front-rear direction of the present embodiment is the sub-scanning direction.

A pair of guide shafts 21 and 22 are fixed to the upper end of the frame body 2. The guide shaft 21 is disposed at a front end portion of the frame body 2 and extends in the left-right direction from the left end to the right end of the frame body 2. The guide shaft 22 is disposed substantially at the center of the frame body 2 in the front-rear direction, and is positioned further to the rear than the guide shaft 21. The guide shaft 22 extends in the left-right direction from the left end to the right end of the frame body 2. The guide shafts 21 and 22 support the carriage 6. The carriage 6 has a plate shape and extends in the front-rear direction and the left-right direction. The carriage 6 extends from the guide shaft 21 to the guide shaft 22.

A drive belt 98 is connected to a rear end portion of the carriage 6. The drive belt 98 is provided on the guide shaft 22 and extends in the left-right direction. The left end portion of the drive belt 98 is connected to a main scanning motor 99. The main scanning motor 99 is provided on the left end portion of the guide shaft 22. Driving the main scanning motor 99 causes the drive belt 98 to move the carriage 6 in the left-right direction along the guide shaft 21 and the guide shaft 22. Therefore, in the present embodiment, the left-right direction is the main scanning direction. FIG. 1 and FIG. 2 show a state in which the carriage 6 is positioned on the right end of the moving range.

White heads 31 and 32, and color heads 33 and 34 are provided at the carriage 6. Each of the white heads 31 and 32, and the color heads 33 and 34 have the same configuration, and in the present embodiment, have a cuboid shape. Hereinafter, when the white heads 31 and 32, and the color heads 33 and 34 are collectively referred to, or when no particular head is specified, they are referred to as a "head 3" or "heads 3." The white heads 31 and 32 are positioned at a rear portion of the carriage 6. The white head 31 is positioned at a rear right portion of the carriage 6. The white head 32 is positioned further to the left than the white head 31, and is displaced to the front with respect to the white head 31. The rear portion of the white head 32 overlaps, in the left-right direction, with the front portion of the white head 31.

The color heads 33 and 34 are positioned to the front of the white heads 31 and 32. The color heads 33 and 34 are respectively positioned at the same positions, in the left-right direction, as the white heads 31 and 32. The color head 34 is positioned further to the left than the color head 33, and is displaced to the front with respect to the color head 33. The rear portion of the color head 34 overlaps, in the left-right direction, with the front portion of the color head 33.

Figure 3:
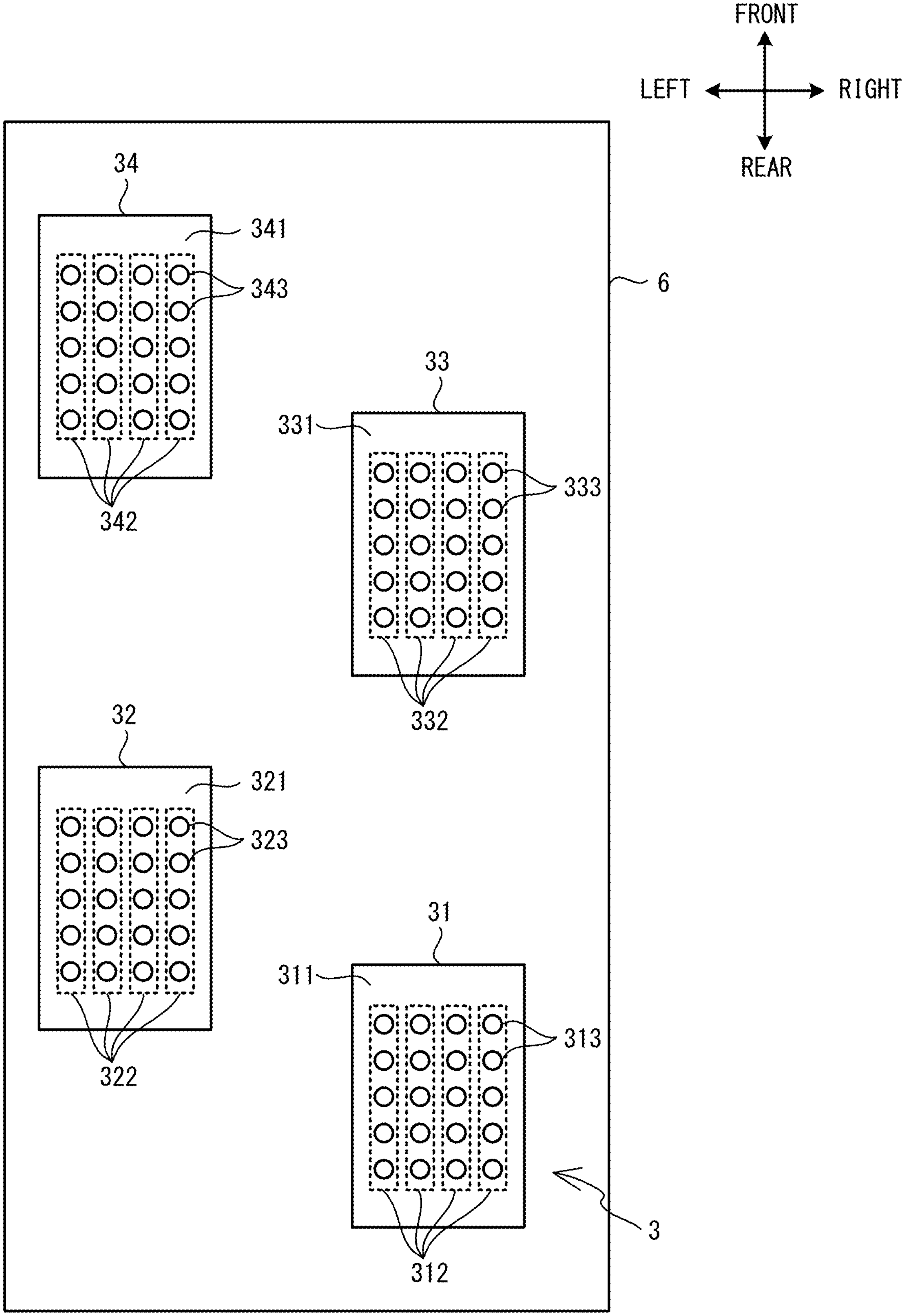
FIG. 3 is a schematic diagram of a carriage as seen from below.

As shown in FIG. 3, a nozzle surface 311 is provided at the lower surface of the white head 31. The nozzle surface 311 extends in the front-rear direction and the left-right direction. A plurality of nozzle rows 312 are formed in the nozzle surface 311. The plurality of nozzle rows 312 are aligned in the left-right direction. The plurality of nozzle rows 312 are configured by a plurality of nozzles 313 arranged in a single column in the front-rear direction. White ink corresponds to each of the plurality of nozzle rows 312. The plurality of nozzles 313 are openings, and discharge the white ink downward.

In a similar manner to the configuration of the white head 31, nozzle surfaces 321, 331, and 341 are respectively provided at the lower surfaces of the white head 32 and the color heads 33 and 34. The nozzle surfaces 321, 331, and 341 extend in the front-rear direction and the left-right direction. A plurality of nozzle rows 322, 332, and 342 are respectively formed in the nozzle surfaces 321, 331, and 341. The plurality of nozzle rows 322, 332, and 342 are respectively arranged in the left-right direction. The plurality of nozzle rows 322, 332, and 342 are respectively configured by a plurality of nozzles 323, 333, and 343 arranged in a single column in the front-rear direction.

The white ink corresponds to each of the plurality of nozzle rows 322. In other words, the plurality of nozzles 323 discharge the white ink downward. Different colored color inks correspond to the plurality of nozzle rows 332, respectively. In other words, the plurality of nozzles 333 discharge, downward, color ink of a color corresponding to each of the plurality of nozzle rows 332. Different colored color inks correspond to the plurality of nozzle rows 342, respectively. In other words, the plurality of nozzles 343 discharge, downward, color ink of a color corresponding to each of the plurality of nozzle rows 342.

According to the above-described configuration, as shown in FIG. 1 and FIG. 2, the heads 3 move in the left-right direction together with the carriage 6. A region in which a movement path of the platen 12 in the left-right direction overlaps, in the up-down direction, with a movement path of the heads 3 in the front-rear direction is referred to as a "printing region 18." Of the movement path of the heads 3, a region that is further to the left than the movement path of the platen 12 is referred to as a "non-printing region 19." When the heads 3 and the platen 12 are positioned in the printing region 18, the platen 12 and the heads 3 face each other in the up-down direction.

Figure 10:
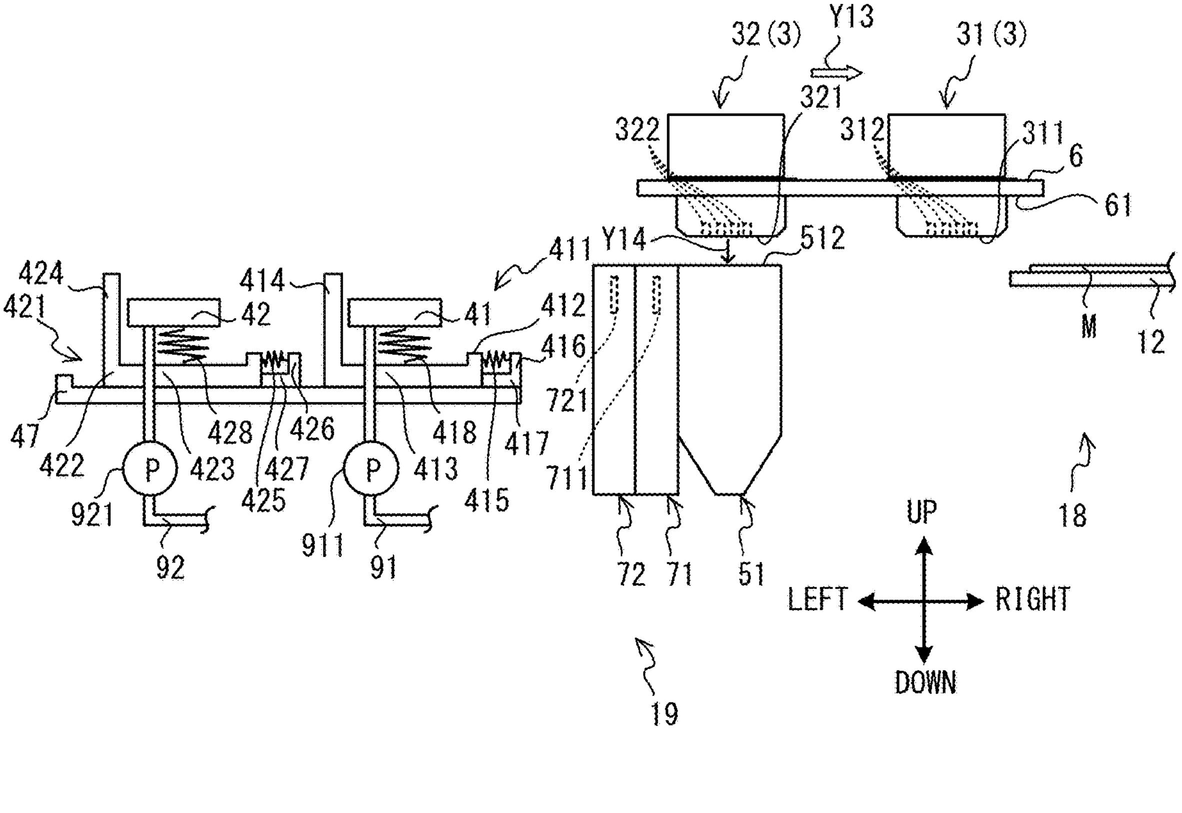
FIG. 10 is a diagram in the direction of arrows along the line A-A shown in FIG. 2 during the movement of the carriage, and when the carriage is positioned at a second flushing position.
Figure 11:
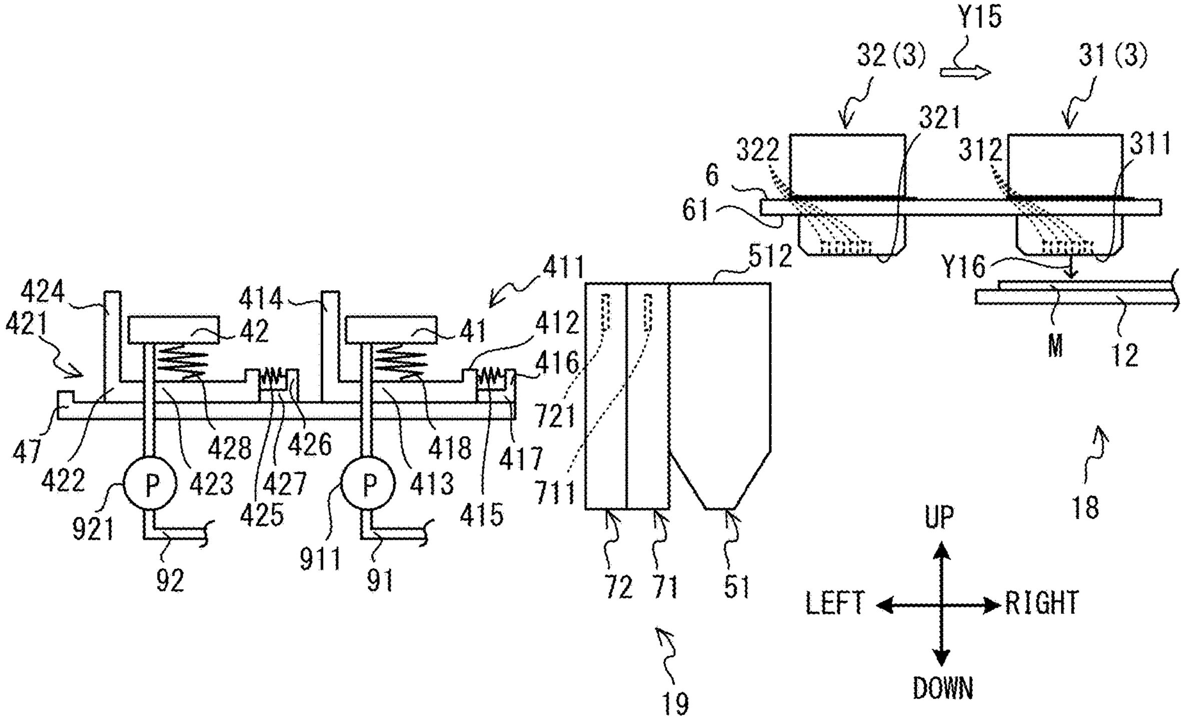
FIG. 11 is a diagram in the direction of arrows along the line A-A shown in FIG. 2 when the carriage is positioned at a print position.
Figure 12:
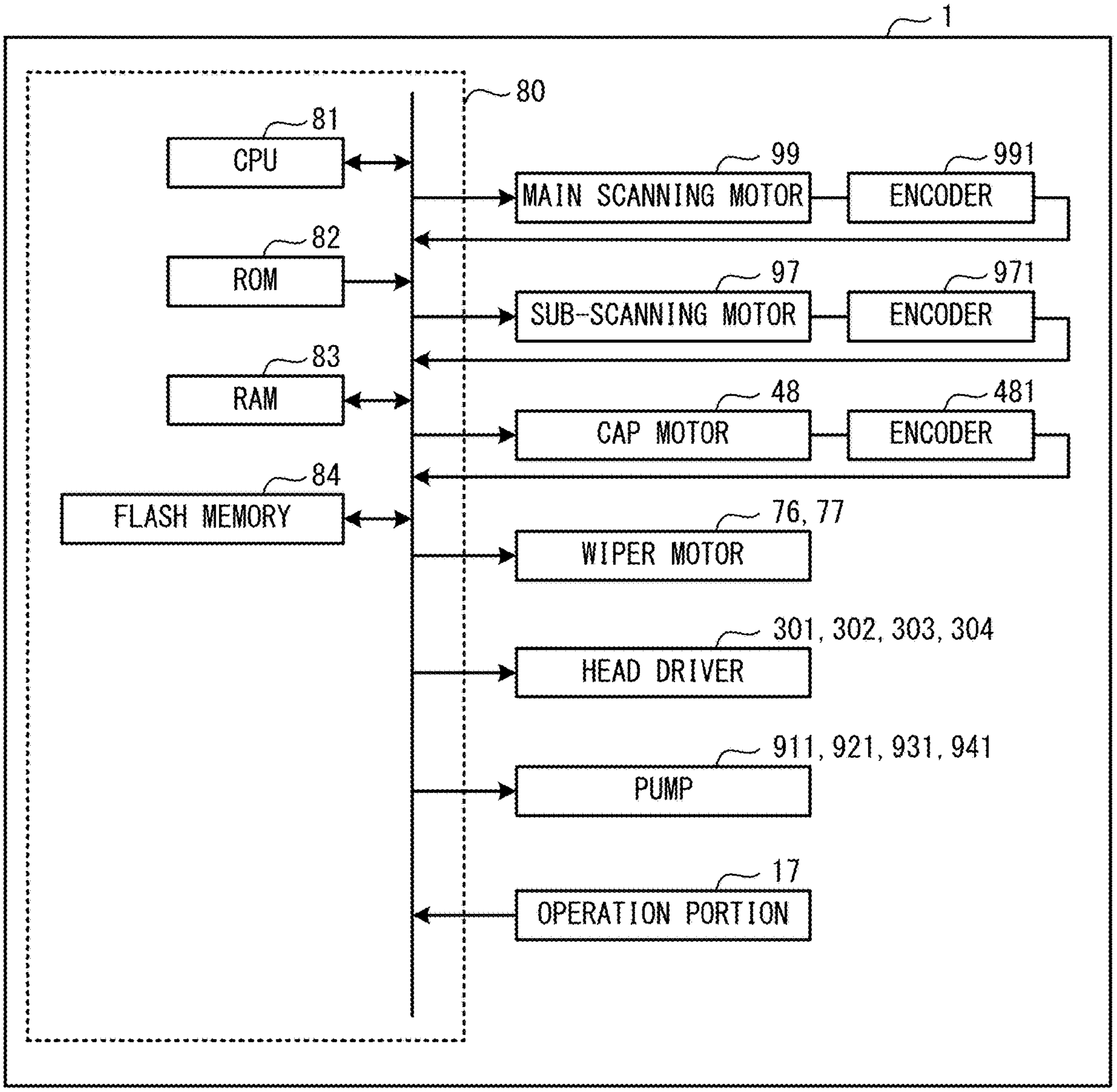
FIG. 12 is a block diagram illustrating an electrical configuration of the printer.

In the printing region 18, the printer 1 conveys a print medium M shown in FIG. 5 to FIG. 11 relative to the heads 3 in the front-rear direction and the left-right direction, by moving the platen 12 in the front-rear direction (the sub-scanning direction) by the driving of the sub-scanning motor 97 shown in FIG. 12, and by moving the carriage 6 in the left-right direction (the main scanning direction) by the driving of the main scanning motor 99.

In operation in which the carriage 6 moves in the left-right direction while discharging the ink from the heads 3 is referred to as "discharge scanning." The printer 1 performs printing on the print medium M by repeating the discharge scanning and the movement of the platen 12 in the front-rear direction. For example, the printer 1 forms a base image on the print medium M by discharging the white ink from the white heads 31 and 32 in the discharge scanning. The printer 1 prints a color image by discharging the color inks from the color heads 33 and 34 onto the base image formed on the print medium M in the discharge scanning.

As shown in FIG. 1 and FIG. 2, the printer 1 is provided with a cap mechanism 4. The cap mechanism 4 is provided in the non-printing region 19, and is provided with a cap support portion 47 and cap units 411, 421, 431, and 441. The cap support portion 47 has a plate shape and extends in the front-rear direction and the left-right direction. The cap support portion 47 is positioned lower than the guide shafts 21 and 22 in the non-printing region 19, and extends from a position in the vicinity of the rear side of the guide shaft 21 to a position in the vicinity of the front side of the guide shaft 22. The cap support portion 47 moves in the up-down direction (refer to FIG. 5 to FIG. 11) as a result of the driving of a cap motor 48 shown in FIG. 12.

Figure 5:
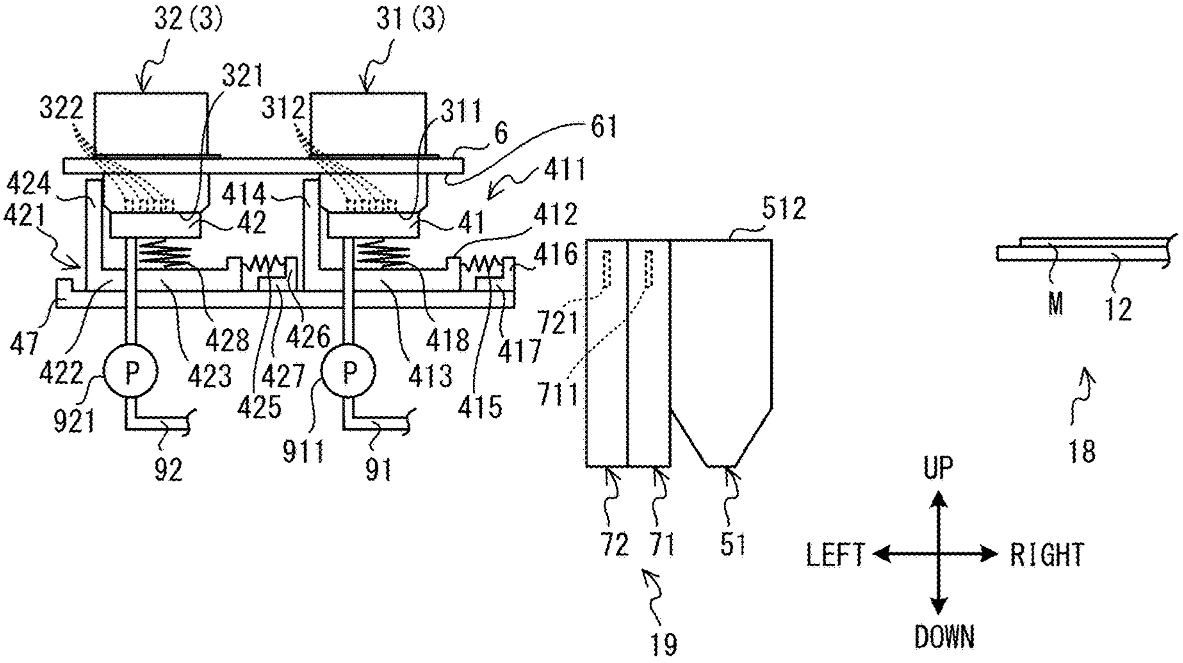
FIG. 5 is a diagram in the direction of arrows along a line A-A shown in FIG. 2 when the carriage is positioned at a cap position, and a cap support portion is positioned at a raised position.

Each of the cap units 411, 421, 431, and 441 have the same structure. As shown in FIG. 5, the cap unit 411 is provided with a holder 412 and a cap 41. The holder 412 includes a bottom wall 413 and a left wall 414. The bottom wall 413 extends in the front-rear direction and the left-right direction, and is supported by the upper surface of the cap support portion 47. The holder 412 can move in the left-right direction with respect to the cap support portion 47. The left wall 414 extends further upward, from the left end of the bottom wall 413, than the cap 41, and also extends in the front-rear direction.

A tension spring 415 is provided at the right of the holder 412. The tension spring 415 extends in the left-right direction. The left end of the tension spring 415 is connected to the right end of the bottom wall 413. The right end of the tension spring 415 is connected to the left surface of a fixed wall 416. The fixed wall 416 is positioned to the right of the holder 412, is fixed to the upper surface of the cap support portion 47, and extends upward from the cap support portion 47. The tension spring 415 urges the holder 412 to the right. A contact wall 417 is provided at the fixed wall 416. The contact wall 417 extends to the left from the bottom end of the fixed wall 416.

The cap 41 is, for example, configured by an elastic body, such as rubber, and is open in the upward direction. The cap 41 is configured such that a positional relationship between the holder 412 and the cap 41 in the left-right direction does not change, even when the holder 412 moves in the left-right direction with respect to the cap support portion 47. For example, the cap 41 is supported by the holder 412 via a compression spring 418. The compression spring 418 extends in the up-down direction. The lower end of the compression spring 418 is connected to the upper surface of the bottom wall 413. The upper end of the compression spring 418 is connected to the bottom surface of the cap 41. The compression spring 418 urges the cap 41 upward.

A waste liquid flow passage 91 is connected to the cap 41. A pump 911 is provided at the waste liquid flow passage 91. By driving the pump 911, waste liquid inside the cap 41 is discharged, via the waste liquid flow passage 91, to a waste liquid tank (not shown in the drawings).

In a similar manner to the cap unit 411, the cap unit 421 is provided with a holder 422 and a cap 42. The holder 422 includes a bottom wall 423 and a left wall 424. A tension spring 425 urges the holder 422 to the right. A fixed wall 426 and a contact wall 427 are provided to the right of the holder 422. A compression spring 428 urges the cap 42 upward. A waste liquid flow passage 92 is connected to the cap 42. By driving a pump 921, waste liquid inside the cap 42 is discharged, via the waste liquid flow passage 92, to the waste liquid tank (not shown in the drawings).

As shown in FIG. 1 and FIG. 2, in a similar manner to the cap units 411 and 421, the cap units 431 and 441 are provided, respectively, with holders 432 and 442, and caps 43 and 44. Waste liquid flow passages are connected to each of the caps 43 and 44. Pumps 931 and 941 shown in FIG. 12 are respectively provided at the waste liquid flow passages. By driving the pumps 931 and 941, liquid inside the caps 43 and 44 is discharged, via the waste liquid flow passages, to a waste liquid tank (not shown in the drawings). A detailed description of the cap units 431 and 441 will be omitted.

The caps 41 and 42 are positioned, respectively, in the same positions as the white heads 31 and 32 in the front-rear direction. A positional relationship between the caps 41 and 42 is the same as a positional relationship between the white heads 31 and 32. A positional relationship of the caps 43 and 44 with respect to the color heads 33 and 34 and a positional relationship between the caps 43 and 44 are, respectively, the same as the positional relationship of the caps 41 and 42 with respect to the white heads 31 and 32, and the positional relationship between the caps 41 and 42.

A relationship of operations of the cap units 431 and 441 with respect to the color heads 33 and 34 is the same as a relationship of operations of the cap units 411 and 421 with respect to the white heads 31 and 32. Hereinafter, the positional relationship and the relationship of the operations of the cap units 411 and 421 with respect to the white heads 31 and 32 will be described, and a description of the relationship of the operations of the cap units 431 and 441 with respect to the color heads 33 and 34 will be omitted or simplified.

According to the above-described configuration, the tension springs 415 and 425 respectively urge the holders 412 and 422 to the right. Thus, as shown in FIG. 11, when the carriage 6 is positioned in the printing region 18, for example, the movement of the holders 412 and 422 to the right is restricted by the right ends of the bottom walls 413 and 423 coming into contact with the left ends of the contact walls 417 and 427.

Figure 6:
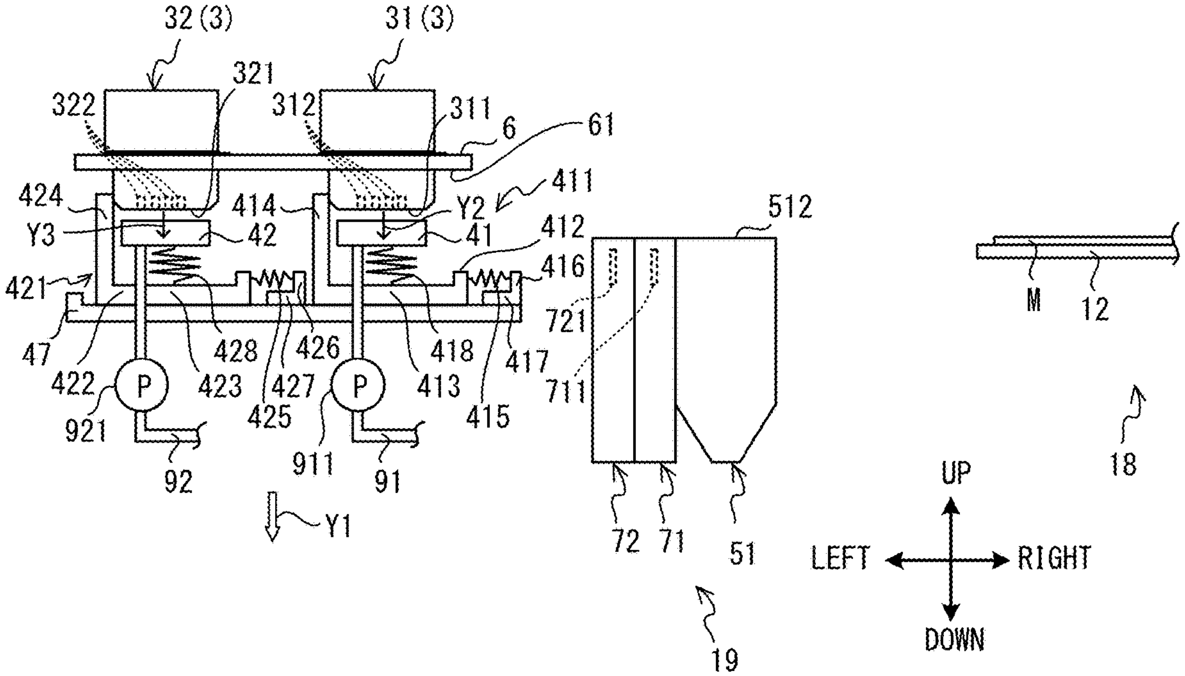
FIG. 6 is a diagram in the direction of arrows along the line A-A shown in FIG. 2 when the carriage is positioned at the cap position, and the cap support portion is positioned at an intermediate position, and is a diagram of the carriage in a stopped state.
Figure 7:
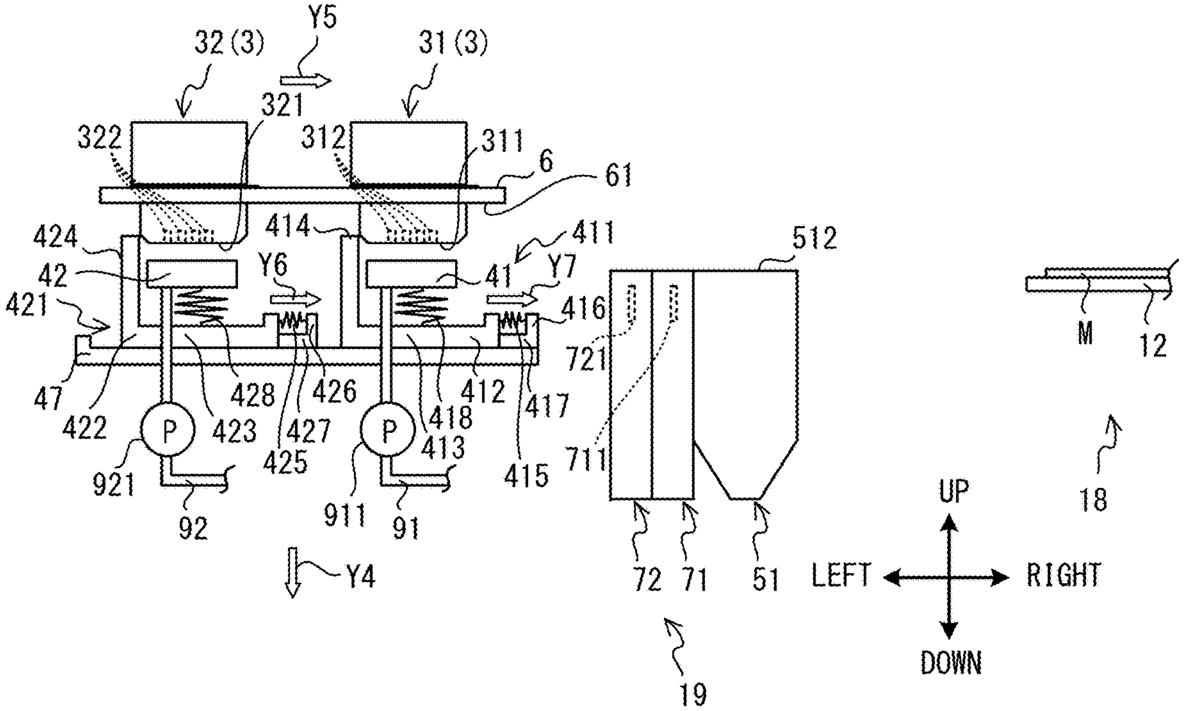
FIG. 7 is a diagram in the direction of arrows along the line A-A shown in FIG. 2 when the carriage is positioned at the cap position, and the cap support portion is positioned at the intermediate position, and is a diagram of a state in which movement of the carriage is started.

The cap support portion 47 moves in the up-down direction, between a lowered position shown in FIG. 8 to FIG. 11 and a raised position shown in FIG. 5, via an intermediate position shown in FIG. 6 and FIG. 7. As shown in FIG. 8 to FIG. 11, the lowered position is a position of a lower end of a movement range of the cap support portion 47. When the cap support portion 47 is positioned at the lowered position, the upper ends of the left walls 414 and 424 are positioned lower than the nozzle surfaces 311 and 321. In this case, even if the carriage 6 moves to the left end of the movement range, the nozzle surfaces 311 and 321 pass above the holders 412 and 422 and thus the white heads 31 and 32 do not come into contact with the holders 412 and 422.

Figure 8:
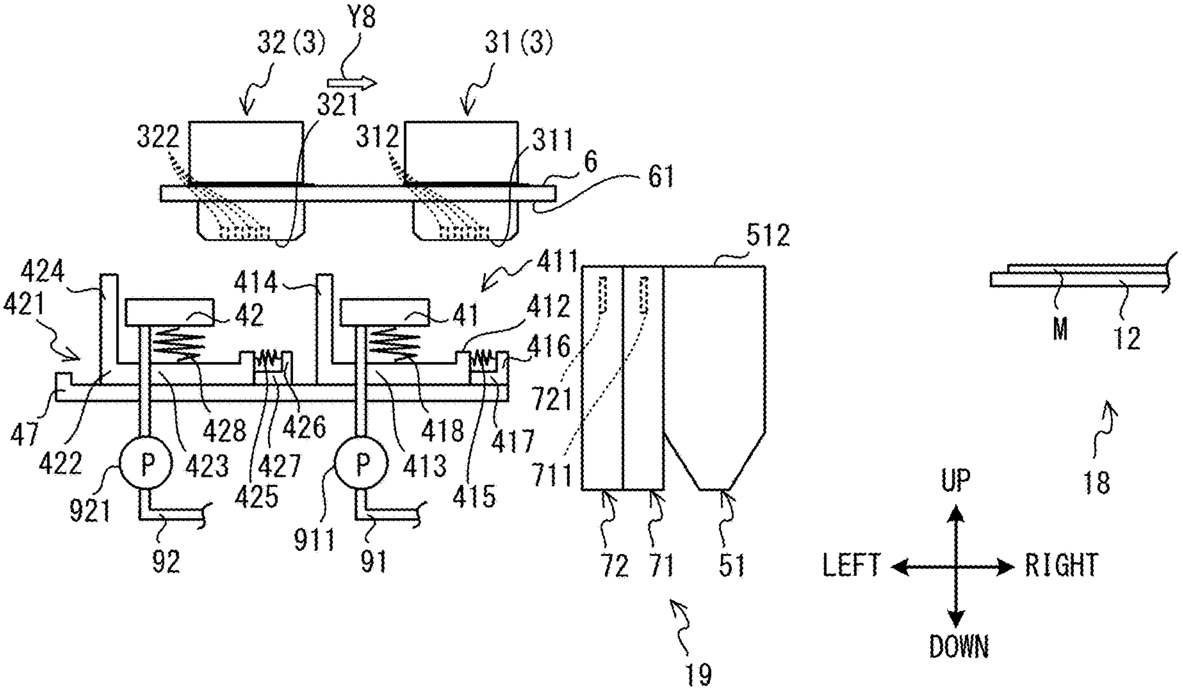
FIG. 8 is a diagram in the direction of arrows along the line A-A shown in FIG. 2 during the movement of the carriage, and when the cap support portion is positioned at a lowered position.

As shown in FIG. 6 and FIG. 7, the intermediate position is a position that is higher than the lowered position shown in FIG. 8 and FIG. 11. When the cap support portion 47 is positioned at the intermediate position, the upper ends of the left walls 414 and 424 are positioned higher than the nozzle surfaces 311 and 321, and lower than a bottom surface 61 of the carriage 6, and the caps 41 and 42 are positioned lower than the nozzle surfaces 311 and 321. In this case, even if the carriage 6 moves to the left end of the movement range, the bottom surface 61 of the carriage 6 passes above the holders 412 and 422, and thus the carriage 6 does not come into contact with the holders 412 and 422. When the carriage 6 moves to the left end of the movement range, the upper ends of the left walls 414 and 424 are positioned higher than the nozzle surfaces 311 and 321, and thus the left surfaces of the white heads 31 and 32 come into contact with the right surfaces of the left walls 414 and 424, respectively.

As shown in FIG. 6, when the carriage 6 moves to the left end of the movement range, the holders 412 and 422 resist the urging force of the tension springs 415 and 425, and move to the left on the cap support portion 47 in a state in which the white heads 31 and 32 are in contact with the left walls 414 and 424. In this way, the holders 412 and 422 are separated, to the left, from the contact walls 417 and 427. The position of the caps 41 and 42 with respect to the white heads 31 and 32, in the left-right direction, is determined by the contact between the white heads 31 and 32 and the holders 412 and 422. In this case, the caps 41 and 42 are respectively disposed above the white heads 31 and 32, and face the white heads 31 and 32 in the up-down direction. Hereinafter, the position of the carriage 6 when the white heads 31 and 32 respectively face the caps 41 and 42 in the up-down direction is referred to as a "cap position" (refer to FIG. 5 and FIG. 6). Note that when the carriage 6 is positioned at the cap position, the color heads 33 and 34 shown in FIG. 1 and FIG. 2 respectively face the caps 43 and 44 shown in FIG. 1 and FIG. 2, in the up-down direction.

As shown in FIG. 5, the raised position is a position higher than the intermediate position shown in FIG. 6. When the carriage 6 is positioned at the cap position and the cap support portion 47 is positioned at the raised position, the upper ends of the left walls 414 and 424 are positioned lower than the bottom surface 61 of the carriage 6, and the caps 41 and 42 come into contact, from below, with the nozzle surfaces 311 and 321. In this case, the caps 41 and 42 adhere closely to the nozzle surfaces 311 and 321 by the urging force of the compression springs 418 and 428. "Adhere closely to" means, for example, that the caps 41 and 42 are in contact with the nozzle surfaces 311 and 321 to an extent that a pressure difference between the interior and exterior of the caps 41 and 42 can be maintained. In this way, capping by the caps 41 and 42 is performed (this applies also to the caps 43 and 44). During a period in which the printing is not performed, the printer 1 performs the capping in order to suppress drying out of the ink.

Hereinafter, as shown in FIG. 5, a state in which the capping is being performed, that is, a state in which each of the caps 41 and 42 adheres closely, from below, to the nozzle surfaces 311 and 321 of the white heads 31 and 32, is referred to as a "capping state." Note that, in the capping state, each of the caps 43 and 44 also adheres closely, from below, to the nozzle surfaces 331 and 341 of the color heads 33 and 34. As shown in FIG. 6 to FIG. 11, a state in which the capping is not being performed, that is, a state in which each of the caps 41 and 42 is separated downward from the nozzle surfaces 311 and 321 is referred to as an "uncapping state."

Figure 4:
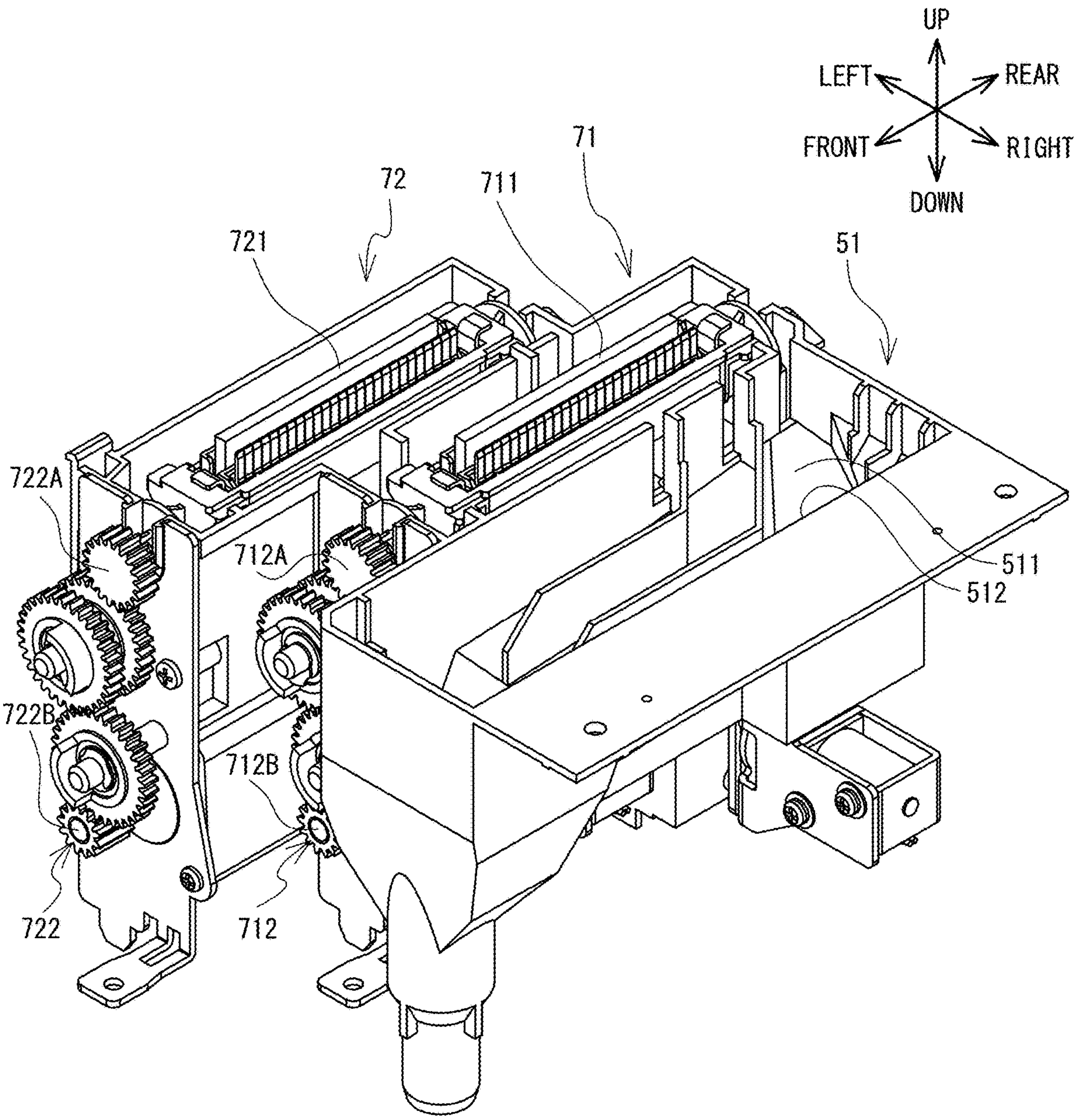
FIG. 4 is a perspective view of wiper mechanisms, and a flushing box.

As shown in FIG. 1 and FIG. 2, the printer 1 is provided with wiper mechanisms 71, 72, 73, and 74. The wiper mechanisms 71 to 74 are provided in the non-printing region 19 and each have the same configuration. As shown in FIG. 4, the wiper mechanisms 71 and 72 are respectively provided with wipers 711 and 721, and a plurality of gears 712 and 722. The wipers 711 and 721 have elasticity and are configured by rubber, a porous member, or the like.

As shown in FIG. 2, the wiper 711 is positioned further to the right than the cap 41. The wiper 711 is positioned in the same position, in the front-rear direction, as the cap 41 and the white head 31. The length of the wiper 711 in the front-rear direction is the same as the length, in the front-rear direction, of the nozzle surface 311 shown in FIG. 3, or is longer than the length of the nozzle surface 311 in the front-rear direction.

The wiper 721 is positioned further to the right than the cap 42, and further to the left than the wiper 711. In the present embodiment, the wiper 721 is positioned further to the right than the cap 41. The wiper 721 is positioned in the same position, in the front-rear direction, as the cap 42 and the white head 32. The length of the wiper 721 in the front-rear direction is the same as the length of the nozzle surface 321, in the front-rear direction, or is longer than the length of the nozzle surface 321 in the front-rear direction.

As shown in FIG. 4, the wiper 711 is coupled to a gear 712A that is furthest to the upper side, of the plurality of gears 712. A wiper motor 76 shown in FIG. 12 is coupled to a gear 712B that is furthest to the lower side, of the plurality of gears 712. In this way, the plurality of gears 712 are coupled to the wiper motor 76 shown in FIG. 12 and to the wiper 711, and transmits a driving force of the wiper motor 76 to the wiper 711.

The wiper 721 is coupled to a gear 722A that is furthest to the upper side, of the plurality of gears 722. A wiper motor 77 shown in FIG. 12 is coupled to a gear 722B that is furthest to the lower side, of the plurality of gears 722. In this way, the plurality of gears 722 are coupled to the wiper motor 77 shown in FIG. 12 and to the wiper 721, and a driving force of the wiper motor 77 is transmitted to the wiper 721.

As shown in FIG. 1 and FIG. 2, in a similar manner to the wiper mechanisms 71 and 72, the wiper mechanisms 73 and 74 are respectively provided with wipers 731 and 741, and a plurality of gears (not shown in the drawings). The wiper 731 is positioned further to the right than the cap 43. In the present embodiment, the wiper 731 is positioned at the same position as the wiper 711 in the left-right direction. The wiper 731 is positioned at the same position as the cap 43 and the color head 33 in the front-rear direction.

The wiper 741 is positioned further to the right than the cap 44, and further to the left than the wiper 731. In the present embodiment, the wiper 741 is positioned further to the right than the cap 43, and is positioned at the same position as the wiper 721 in the left-right direction. The wiper 741 is positioned at the same position as the cap 44 and the color head 34 in the front-rear direction.

The plurality of gears of the wiper mechanism 73 are coupled to the wiper motor 76 shown in FIG. 12, and to the wiper 731, and transmit the driving force of the wiper motor 76 to the wiper 731. The plurality of gears of the wiper mechanism 74 are coupled to the wiper motor 77 shown in FIG. 12, and to the wiper 741, and transmit the driving force of the wiper motor 77 to the wiper 741.

According to the above-described configuration, the wipers 711 and 731 rotate in the clockwise direction or in the counter-clockwise direction in a front view, due to the driving force of the wiper motor 76. Rotation shafts of the wipers 711 and 731 are positioned lower than the nozzle surfaces 311 and 331 shown in FIG. 3, and extend in the front-rear direction. The wipers 721 and 741 rotate in the clockwise direction or in the counter-clockwise direction in a front view, due to the driving force of the wiper motor 77. Rotation shafts of the wipers 721 and 741 are positioned lower than the nozzle surfaces 321 and 341 shown in FIG. 3, and extend in the front-rear direction.

Hereinafter, a posture of each of the wipers 711, 721, 731, and 741 in which the leading ends of each of the wipers 711, 721, 731, and 741 are positioned lower than the nozzle surfaces 311, 321, 331, and 341 shown in FIG. 3 is referred to as a "retracted posture" (refer to FIG. 5 to FIG. 11, for example). In the present embodiment, when each of the wipers 711, 721, 731, and 741 is in the retracted posture, the leading end of each of the wipers 711, 721, 731, and 741 is oriented downward. In this case, even when the white heads 31 and 32 and the color heads 33 and 34 shown in FIG. 2 move in the left-right direction with respect to the wipers 711, 721, 731, and 741, each of the nozzle surfaces 311, 321, 331, and 341 pass above the wipers 711, 721, 731, and 741. As a result, the wipers 711, 721, 731, and 741 do not come into contact with the nozzle surfaces 311, 321, 331, and 341, respectively.

Hereinafter, a posture of the wipers 711, 721, 731, and 741 in which the leading ends of each of the wipers 711, 721, 731, and 741 are positioned at the same height as or above the nozzle surfaces 311, 321, 331, and 341 shown in FIG. 3 is referred to as a "contact posture" (refer to FIG. 4). As shown in FIG. 4, in the present embodiment, when each of the wipers 711 and 721 is in the contact posture, the leading end of each of the wipers 711 and 721 is oriented upward. In a similar manner, when each of the wipers 731 and 741 shown in FIG. 2 is in the contact posture, the leading end of each of the wipers 731 and 741 is oriented upward. In this case, when the white heads 31 and 32 and the color heads 33 and 34 shown in FIG. 2 move in the left-right direction with respect to the wipers 711, 721, 731, and 741, the wipers 711, 721, 731, and 741 come into contact with the nozzle surfaces 311, 321, 331, and 341, respectively. In this way, the wipers 711, 721, 731, and 741 wipe the nozzle surfaces 311, 321, 331, and 341.

As shown in FIG. 4, each of the wipers 711 and 721 enter into the contact posture by rotating in the clockwise direction, in a front view, from the retracted posture. Each of the wipers 711 and 721 enters into the retracted posture by rotating in the counter-clockwise direction in a front view, from the contact posture. In a similar manner, each of the wipers 731 and 741 shown in FIG. 2 also enters the contact posture by rotating in the clockwise direction, in a front view, from the retracted posture. Each of the wipers 731 and 741 enters the retracted posture by rotating in the counter-clockwise direction, in a front view, from the contact posture.

As shown in FIG. 1 and FIG. 2, the printer 1 is provided with flushing boxes 51 and 52. The flushing boxes 51 and 52 are provided in the non-printing region 19 and below the movement path of the heads 3 in the left-right direction, and each has the same configuration. The flushing box 51 is positioned further to the right than the wipers 711 and 721, and further to the left than the platen 12. The flushing box 52 is positioned further to the right than the wipers 731 and 741, and further to the left than the platen 12. The flushing box 52 is positioned further to the front than the flushing box 51.

As shown in FIG. 4, the flushing box 51 is a cuboid box shape. A recessed portion 511 is formed in the flushing box 51. The recessed portion 511 is recessed downward from the upper surface of the flushing box 51. In other words, the flushing box 51 is open upward. Hereinafter, a region surrounded by the upper edge of the recessed portion 511 is referred to as a "receiver 512." The receiver 512 has a rectangular shape in a plan view.

As shown in FIG. 1 and FIG. 2, an absorption member 513 is provided at the recessed portion 511 shown in FIG. 4. Illustration of the absorption member 513 is omitted in FIG. 4. The absorption member 513 is a porous member, such as a sponge or the like. The absorption member 513 absorbs the white ink discharged from the white heads 31 and 32 by a discharge flushing operation to be described later.

The flushing box 52 has the same configuration as the flushing box 51. In other words, a recessed portion (not shown in the drawings) is also formed in the flushing box 52. A receiver 522 is a region surrounded by the upper edge of the recessed portion. An absorption member 523 is provided at the recessed portion of the flushing box 52. The absorption member 523 absorbs the color inks discharged from the color heads 33 and 34 by the discharge flushing operation to be described later.

The electrical configuration of the printer 1 will be explained with reference to FIG. 12. The printer 1 is provided with a control board 80. A CPU 81, a ROM 82, a RAM 83, and a flash memory 84 are provided on the control board 80. The CPU 81 controls the printer 1 and is electrically connected to the ROM 82, the RAM 83, and the flash memory 84. The ROM 82 stores a control program used for the CPU 81 to control operations of the printer 1, and various pieces of information and the like needed by the CPU 81 when executing various programs. The ROM 82, for example, stores each of positions of the carriage 6, on the basis of a rotation angle of the main scanning motor 99, and stores each of positions of the platen 12, on the basis of a rotation angle of the sub-scanning motor 97. The RAM 83 temporarily stores various data used by the control program. The flash memory 84 is a non-volatile memory, and stores print data for performing the printing, and the like.

The main scanning motor 99, the sub-scanning motor 97, the cap motor 48, the wiper motors 76 and 77, head drivers 301, 302, 303, and 304, pumps 911, 921, 931, and 941, and an operation portion 17 are electrically connected to the CPU 81. The main scanning motor 99, the sub-scanning motor 97, the cap motor 48, the wiper motors 76 and 77, the head drivers 301 to 304, and pumps 911, 921, 931, and 941 are driven by control by the CPU 81.

Encoders 991, 971, and 481 are respectively provided in the main scanning motor 99, the sub-scanning motor 97, and the cap motor 48. The encoder 991 detects the rotation angle of the main scanning motor 99, and outputs a detection result to the CPU 81. The encoder 971 detects the rotation angle of the sub-scanning motor 97, and outputs a detection result to the CPU 81. The encoder 481 detects the rotation angle of the cap motor 48, and outputs a detection result to the CPU 81. The head drivers 301 to 304 are configured by piezoelectric elements or heating elements, for example. As a result of the head drivers 301 to 304 being driven, the inks are respectively discharged from the white heads 31 and 32 and the color heads 33 and 34.

The operation portion 17 is a touch panel and the like, and outputs information, to the CPU 81, in accordance with an operation by a user. By the user operating the operation portion 17, a print command for starting the printing by the printer 1 and the like can be input to the printer 1.

Ink discharge failures will be described. A state in which solvent components in the ink volatilize, and a concentration of solid components, such as pigment particles and the like, in the ink becomes locally increased is referred to as a "dry state." A state in which the solid components, such as the pigment particles and the like, in the ink are locally precipitated is referred to as a "precipitated state." For example, when the ink in the nozzle in the head 3 is exposed to the atmosphere, the solvent components volatilize from the ink in the nozzle via a meniscus, and the ink inside the nozzle is in the dry state. For example, when the ink inside the nozzle in the head 3 is retained, the pigment particles in the ink precipitate in the vicinity of the meniscus, and the ink inside the nozzle is in the precipitated state. In these cases, in the head 3, the fluidity of the ink in the vicinity of the meniscus inside the nozzle deteriorates locally. Thus, in the head 3, it is easier for a discharge failure to occur in which the ink is not discharged from the nozzle.

The flushing operations will be described. The flushing operations include the discharge flushing operation and a non-discharge flushing operation. The discharge flushing operation is an operation to discharge the ink from the nozzles of the heads 3 by driving the head drivers 301 to 304. When the discharge flushing operation is performed by the head 3, the ink that is in the dry state or in the precipitated state is discharged from the nozzles. In this way, the dry state or the precipitated state of the ink inside the nozzles of the head 3 is resolved.

The non-discharge flushing operation is an operation in which the ink is not discharged from the nozzles of the heads 3, and is an operation in which the ink inside the nozzles of the heads 3 is caused to oscillate by the driving of the head drivers 301 to 304. When the non-discharge flushing operation is performed by the head 3, the ink in the vicinity of the meniscus that is in the dry state or the precipitated state is mixed with the ink that is further upstream than the meniscus as is not in the dry state or the precipitated state. In this way, the dry state or the precipitated state of the ink inside the nozzles of the head 3 is resolved.

Main processing will be described with reference to FIG. 5 to FIG. 16. When the operation portion 17 is operated by the user and the print command is input to the printer 1, the CPU 81 performs the main processing by reading out and executing the control program from the ROM 82. As shown in FIG. 5, the main processing is started, for example, when the wipers 711 and 721 are in the retracted posture in the capping state.

In the left-right direction, in each of positions in which the carriage 6 is positioned, the positional relationship of the color heads 33 and 34 with respect to the wiper mechanisms 73 and 74, the cap units 431 and 441, and the flushing box 52 (not shown in the drawings) is the same as the positional relationship of the white heads 31 and 32 with respect to the wiper mechanisms 71 and 72, the cap units 411 and 421, and the flushing box 51 shown in FIG. 7 to FIG. 14. The color heads 33 and 34, the cap units 431 and 441, and the wiper mechanisms 71 and 72 perform the same operations as the white heads 31 and 32, the cap units 411 and 421, and the wiper mechanisms 73, and 74, respectively. Hereinafter, a description of the positional relationship of color heads 33 and 34 with respect to the wiper mechanisms 73 and 73, the cap units 431 and 441, and the flushing box 52, and a description of the operations of the color heads 33 and 34, the operations of the cap units 431 and 441, and the operations of the wiper mechanisms 73 and 74 will be omitted.

Figure 13:
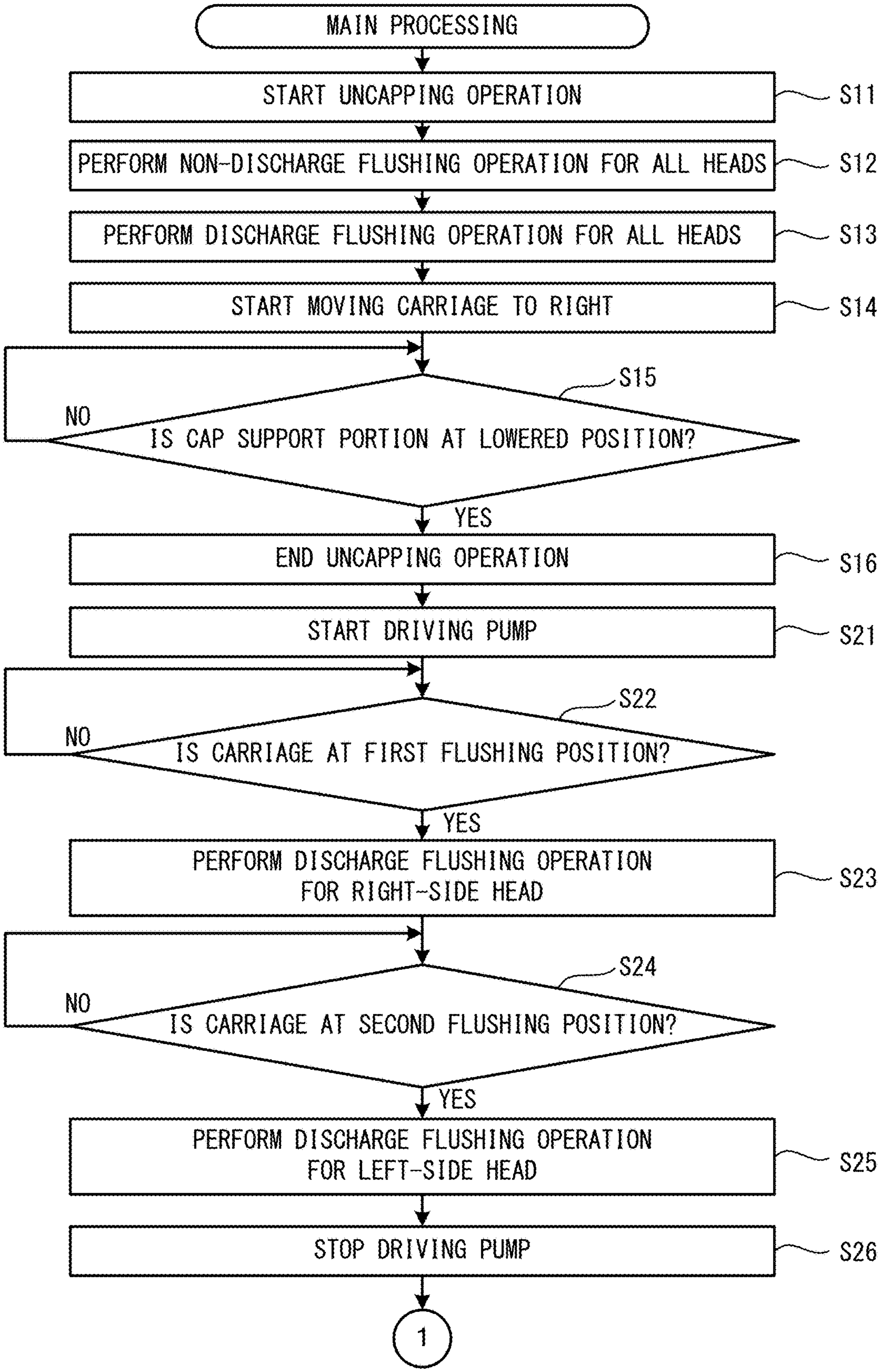
FIG. 13 is a flowchart of main processing.

As shown in FIG. 13, when the main processing is started, the CPU 81 starts an uncapping operation to switch from the capping state shown in FIG. 5 to an uncapping state shown in FIG. 6 (step S11). For example, the CPU 81 starts driving of the cap motor 48 shown in FIG. 12. In this way, the cap support portion 47 starts to move downward from the raised position shown in FIG. 5 toward the intermediate position shown in FIG. 6 (refer to an arrow Y1 in FIG. 6). Thus, as shown in FIG. 6, the caps 41 and 42 are respectively separated downward from the nozzle surfaces 311 and 321. In other words, the caps 41 and 42 are released from the capping state shown in FIG. 5, and enter the uncapping state shown in FIG. 6.

As shown in FIG. 13, the CPU 81 performs the following step S12 to step S14 while performing the uncapping operation. In other words, the processing from step S12 to step S14 below is performed while the cap support portion 47 is moving. The CPU 81 controls the head drivers 301 and 302 shown in FIG. 12, and causes the white heads 31 and 32 shown in FIG. 6 to perform the non-discharge flushing operation during a non-discharge flushing operation time period (step S12). For example, the CPU 81 continuously outputs, to the head drivers 301 and 302, a pulse signal having a pulse width T1 shown in FIG. 15, during the non-discharge flushing operation time period. The pulse width T1 has a length approximately that over which the ink is not discharged from the white heads 31 and 32. As a result of the driving of the head drivers 301 and 302 by the continuous pulse signal having the pulse width T1, the ink inside the nozzles 313 and 323 oscillates. The non-discharge flushing operation time period is shorter, for example, than the time required from a start time point of the uncapping operation to when the cap support portion 47 reaches the intermediate position shown in FIG. 6.

Before performing the discharge flushing operation by processing at step S13 to be described below, in the uncapping state, the CPU 81 performs the non-discharge flushing operation by the processing at step S12. As shown in FIG. 5, for example, immediately after the start of the uncapping operation, even when the cap support portion 47 moves downward, the compression springs 418 and 428 extend in the up-down direction due to elastic deformation. In other words, the compression springs 418 and 428 deform in an attempt to return to an original shape from a compressed shape. Thus, immediately after the start of the uncapping operation, the capping state is not immediately released. The non-discharge flushing operation time period is longer, for example, than the time required from the start time point of the uncapping operation to when the capping state is released. In this way, the CPU 81 can perform the non-discharge flushing operation, by the processing at step S12, up to when the capping state is released. Thus, by performing the non-discharge flushing operation by the processing at step S12, the CPU 81 can suppress the discharge flushing operation by the processing at step S13 from being performed in the capping state.

As shown in FIG. 13, the CPU 81 controls the head drivers 301 and 302 shown in FIG. 12, and causes the white heads 31 and 32 shown in FIG. 6 to perform the discharge flushing operation during a discharge flushing operation time period (step S13). For example, during the discharge flushing operation time period, the CPU 81 outputs, to the head drivers 301 and 302, a pulse signal having a pulse width T2 shown in FIG. 16. The pulse width T2 has a length approximately that over which the ink is discharged from the white heads 31 and 32, and is longer than the pulse width T1 shown in FIG. 15. As a result of the driving of the head drivers 301 and 302 by the pulse signal having the pulse width T2, the ink inside the nozzles 313 and 323 is discharged. The discharge flushing operation time period is shorter than the time required from a time point at which the non-discharge flushing operation time period has elapsed to when the cap support portion 47 reaches the lowered position shown in FIG. 8.

As shown in FIG. 6, while the caps 41 and 42 are moving downward in the uncapping state as a result of the processing at step S11 shown in FIG. 13 (refer to the arrow Y1), the white heads 31 and 32 discharge the ink toward the caps 41 and 42 as a result of the processing at step S13 shown in FIG. 13 (refer to an arrow Y2 and an arrow Y3). The discharge flushing operation by the processing at step S13 ends by the time the cap support portion 47 moves as far as the lowered position shown in FIG. 8. In other words, the discharge flushing operation by the processing at step S13 is performed in a state in which the white heads 31 and 32 are in contact with the left walls 414 and 424, and the position of the white heads 31 and 32 in the left-right direction is determined with respect to the caps 41 and 42. Thus, during the performing of the discharge flushing operation by the processing at step S13, the white heads 31 and 32 are suppressed from becoming displaced from the caps 41 and 42 in the left-right direction. As a result, the printer 1 can suppress the ink discharged from the white heads 31 and 32 by the processing at step S13 from landing outside the caps 41 and 42.

As shown in FIG. 13, the CPU 81 starts the control of the main scanning motor 99, and moves the carriage 6 to the right from the cap position shown in FIG. 6 (step S14). As shown in FIG. 7, as the cap support portion 47 moves downward (refer to an arrow Y4) as a result of the processing at step S11, the carriage 6 moves to the right as a result of the processing at step S14 (refer to an arrow Y5). In this case, immediately after the movement of the carriage 6 is started by the processing at step S14, as a result of the urging force to the right of the tension springs 415 and 425, the holders 412 and 422 track the white heads 31 and 32 in the state in which the left walls 414 and 424 are in contact with the white heads 31 and 32 (refer to an arrow Y6 and an arrow Y7). Thus, the caps 41 and 42 also track the white heads 31 and 32 (refer to the arrow Y6 and the arrow Y7).

As shown in FIG. 7 and FIG. 8, when the bottom walls 413 and 423 come into contact with the contact walls 417 and 427, the tracking of the white heads 31 and 32 by the holders 412 and 422 ends. In this way, as shown in FIG. 8, the white heads 31 and 32 separate to the right from the holders 412 and 422 (refer to an arrow Y8). In the present embodiment, the movement of the carriage 6 at step S14 is controlled by the CPU 81 such that the upper end of the left wall 414 moves below the nozzle surface 321 before the white head 32 reaches the position of the left wall 414 in the left-right direction, As shown in FIG. 13, the CPU 81 performs the following processing at step S15 to step S31 (refer to FIG. 13 and FIG. 14) during the movement of the carriage 6 by the processing at step S14. On the basis of a detection result from the encoder 481 shown in FIG. 12, the CPU 81 determines whether the cap support portion 47 has moved to the lowered position shown in FIG. 8 (step S15). When the cap support portion 47 is positioned higher than the lowered position shown in FIG. 8 (no at step S15), the CPU 81 returns the processing to step S15. When the cap support portion 47 has moved to the lowered position shown in FIG. 8 (yes at step S15), the CPU 81 stops the driving of the cap motor 48 shown in FIG. 12, and ends the uncapping operation started at step S11 (step S16).

Figure 9:
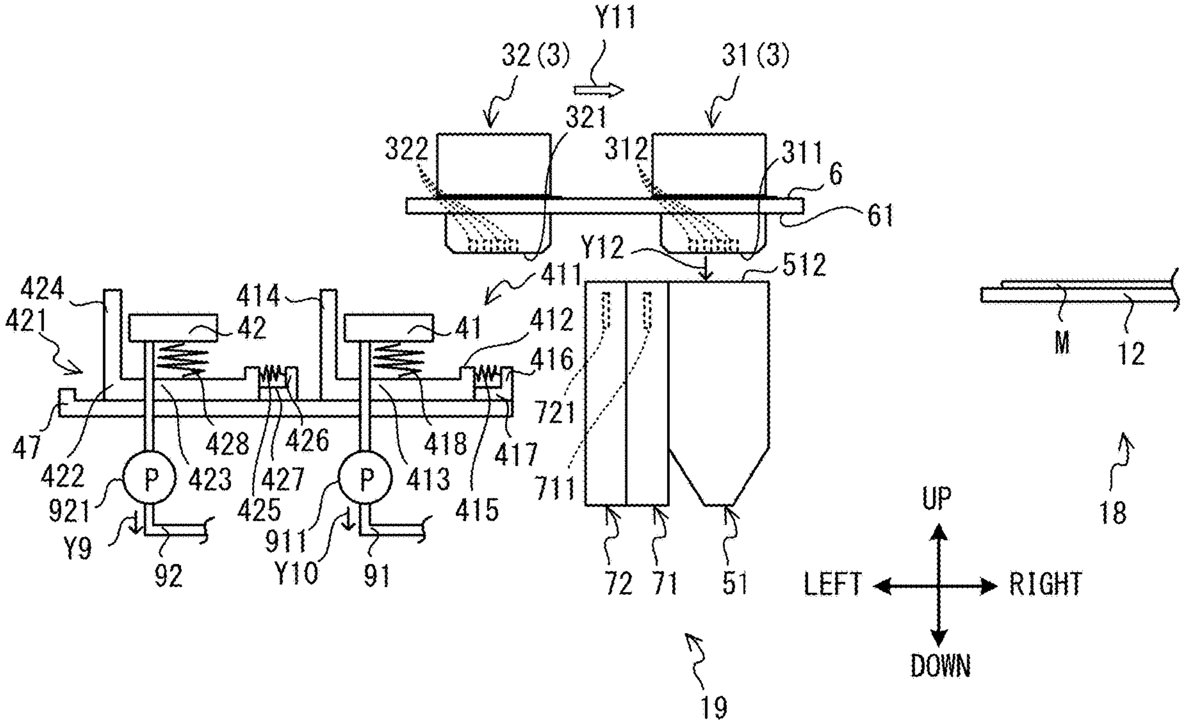
FIG. 9 is a diagram in the direction of arrows along the line A-A shown in FIG. 2 during the movement of the carriage, and when the carriage is positioned at a first flushing position.

The CPU 81 starts the driving of the pumps 911 and 921 shown in FIG. 9 (step S21). In this way, as shown in FIG. 9, the ink accumulated in the caps 41 and 42 by the processing at step S13 shown in FIG. 13 is discharged to the waste liquid tank (not shown in the drawings), via the waste liquid flow passages 91 and 92 (refer to an arrow Y9 and an arrow Y10). The CPU 81 performs the driving of the pumps 911 and 921 during the movement of the carriage 6. In the present embodiment, the CPU 81 continues the driving of the pumps 911 and 921 during the following processing at step S22 to step S25.

As shown in FIG. 13, on the basis of a detection result from the encoder 991 shown in FIG. 12, the CPU 81 determines whether the carriage 6 is positioned at a first flushing position shown in FIG. 9 (step S22). As shown in FIG. 9, when the carriage 6 is positioned at the first flushing position, in the white head 31, at least some of the plurality of nozzle rows 312 face the receiver 512 in the up-down direction.

As shown in FIG. 13, when the carriage 6 is positioned further to the left than the first flushing position shown in FIG. 9 (no at step S22), the CPU 81 returns the processing to step S22. When the carriage 6 is positioned at the first flushing position shown in FIG. 9 (yes at step S22), the CPU 81 controls the head driver 301 shown in FIG. 12 and causes the white head 31 to perform the discharge flushing operation (step S23).

As shown in FIG. 9, the white head 31 discharges the ink toward the flushing box 51 from the plurality of nozzles 313 (refer to an arrow Y12), as a result of the discharge flushing operation by the processing at step S23 shown in FIG. 13. The carriage 6 is positioned at the first flushing position, and thus the white ink discharged from the plurality of nozzles 313 by the discharge flushing operation in the white head 31 passes through the receiver 512 and lands on the absorption member 513 shown in FIG. 1 and FIG. 2. The absorption member 513 absorbs the white ink that has landed thereon.

The discharge flushing operation (refer to the arrow Y12) of the white head 31 as a result of the processing at step S23 shown in FIG. 13 is performed during the movement of the carriage 6 (refer to the arrow Y11) as a result of the processing at step S14 shown in FIG. 13. In the processing at step S23 shown in FIG. 13, for example, on the basis of the detection result from the encoder 991 shown in FIG. 12, the CPU 81 identifies at least one nozzle row 312 facing the receiver 512 in the up-down direction, of the plurality of nozzle rows 312 in the white head 31. The CPU 81 controls the head driver 301 shown in FIG. 12 and causes the discharge flushing operation to be performed in the identified at least one nozzle row 312.

As shown in FIG. 13, on the basis of the detection result from the encoder 991 shown in FIG. 12, the CPU 81 determines whether the carriage 6 is positioned at a second flushing position shown in FIG. 10 (step S24). As shown in FIG. 10, when the carriage 6 is positioned at the second flushing position, in the white head 32, at least some of the plurality of nozzle rows 322 face the receiver 512 in the up-down direction.

As shown in FIG. 13, when the carriage 6 is positioned further to the left than the second flushing position shown in FIG. 10 (no at step S24), the CPU 81 returns the processing to step S24. When the carriage 6 is positioned at the second flushing position shown in FIG. 10 (yes at step S24), the CPU 81 controls the head driver 302 shown in FIG. 12 and causes the white head 32 to perform the discharge flushing operation (step S25).

As shown in FIG. 10, the white head 32 discharges the ink toward the flushing box 51 from the plurality of nozzles 323 (refer to an arrow Y14), as a result of the discharge flushing operation by the processing at step S25 shown in FIG. 13. The carriage 6 is positioned at the second flushing position, and thus the white ink discharged from the plurality of nozzles 323 by the discharge flushing operation in the white head 32 passes through the receiver 512 and lands on the absorption member 513 shown in FIG. 1 and FIG. 2. The absorption member 513 absorbs the white ink that has landed thereon.

The discharge flushing operation (refer to the arrow Y14) of the white head 32 as a result of the processing at step S25 shown in FIG. 13 is performed during the movement of the carriage 6 (refer to the arrow Y13) as a result of the processing at step S14 shown in FIG. 13. In the processing at step S25 shown in FIG. 13, for example, on the basis of the detection result from the encoder 991 shown in FIG. 12, the CPU 81 identifies at least one nozzle row 322 facing the receiver 512 in the up-down direction, of the plurality of nozzle rows 322 in the white head 32. The CPU 81 controls the head driver 302 shown in FIG. 12 and causes the discharge flushing operation to be performed in the identified at least one nozzle row 322.

Figure 14:
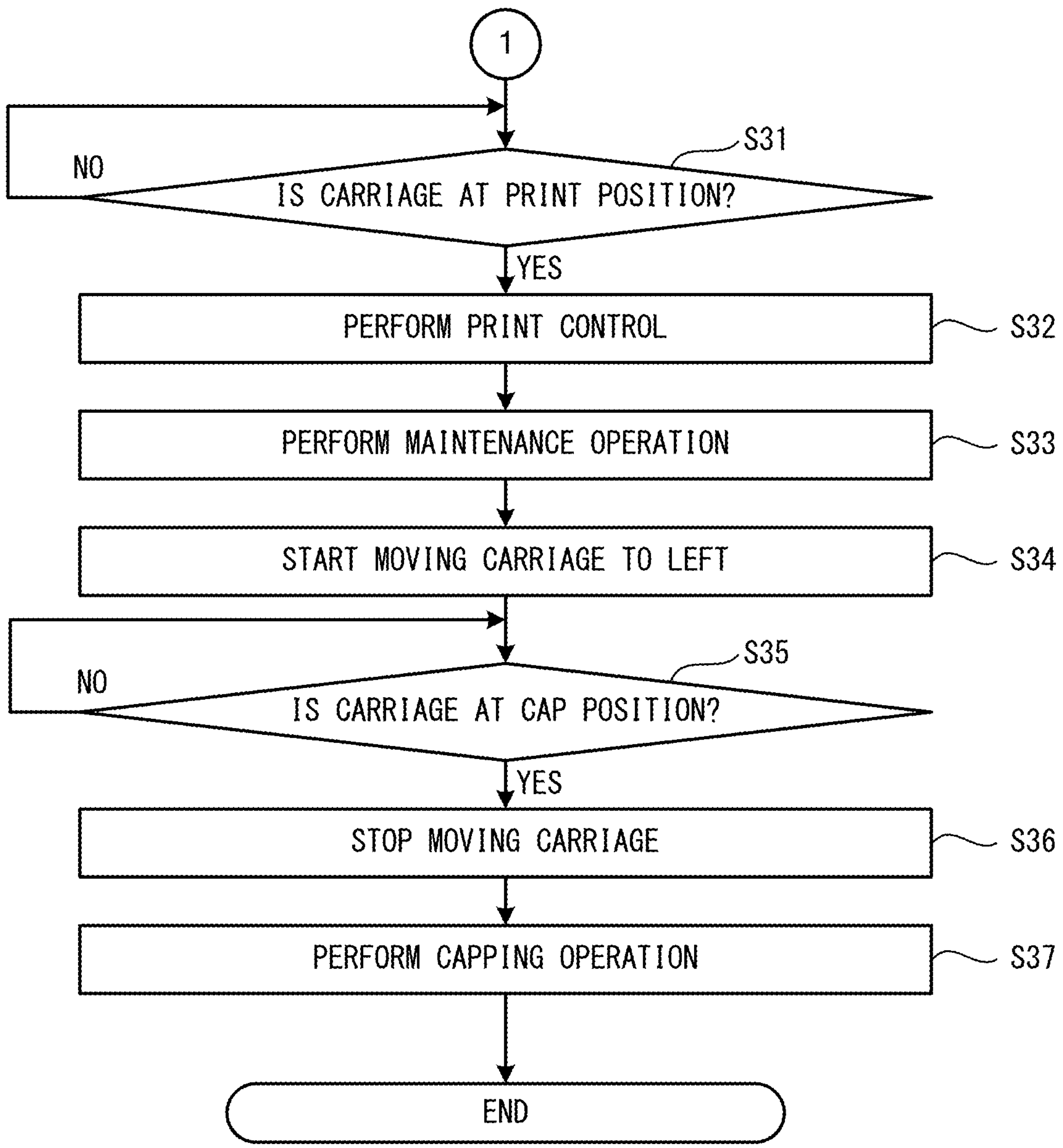
FIG. 14 is a flowchart of the main processing.
Figure 15:
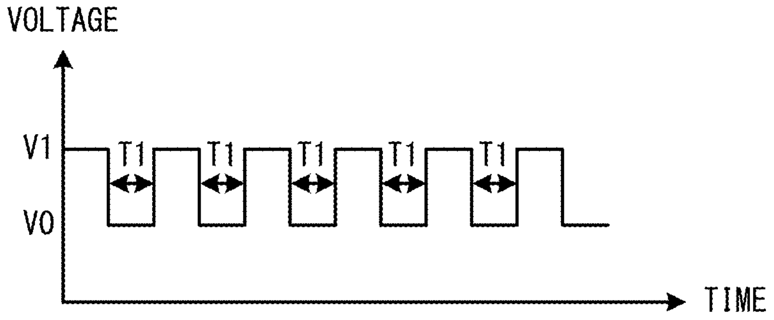
FIG. 15 is a waveform diagram of a pulse signal output from a CPU when a non-discharge flushing operation is performed.
Figure 16:
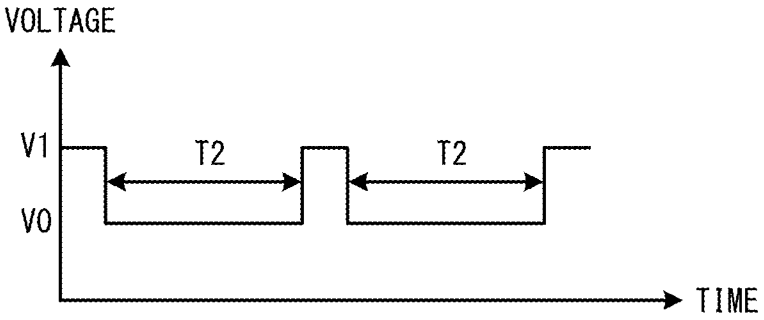
FIG. 16 is a waveform diagram of a pulse signal output from the CPU when a discharge flushing operation is performed.

As shown in FIG. 13 the CPU 81 stops the driving of the pumps 911 and 921 (refer to FIG. 9) started by the processing at step S21 (step S26). Note that the CPU 81 may stop the driving of the pumps 911 and 921 before the processing at step S25, or may stop the driving of the pumps 911 and 921 after processing at step S31 to be described below, such as during print control at step S32, for example. As shown in FIG. 14, on the basis of the detection result from the encoder 991 shown in FIG. 12, the CPU 81 determines whether the carriage 6 is positioned at a print position shown in FIG. 11 (step S31). As shown in FIG. 11, when the carriage 6 is positioned at the print position, at least one of the white heads 31 or 32 faces the platen 12 in the up-down direction.

When the carriage 6 is positioned further to the left than the print position shown in FIG. 11 (no at step S31), the CPU 81 returns the processing to step S31. When the carriage 6 is positioned at the print position shown in FIG. 11 (yes at step S31), the CPU 81 performs the print control on the basis of the print data (step S32). As shown in FIG. 11, in the print control, in the state in which the carriage 6 is positioned at the print position, the CPU 81 controls the head drivers 301 and 302, the main scanning motor 99, and the sub-scanning motor 97 shown in FIG. 12. In this way, by repeating the discharge scanning (refer to an arrow Y15 and an arrow Y16) and the movement of the platen 12 in the front-rear direction, the CPU 81 controls the printing on the print medium M. When the printing on the basis of the print data ends, the CPU 81 ends the print control.

As shown in FIG. 14, the CPU 81 performs a maintenance operation (step S33). In the maintenance operation, the CPU 81 controls the main scanning motor 99, and moves the carriage 6 to the left from the printing region 18 such that the white head 31 is positioned further to the left than the wiper 711. The maintenance operation includes a wiping operation and the discharge flushing operation. In the wiping operation, the CPU 81 controls the wiper motors 76 and 77, and the main scanning motor 99 shown in FIG. 12. In this way, the wiper 711 and the wiper 721 are switched from the retracted posture shown in FIG. 11 to the contact posture shown in FIG. 4, at respective predetermined timings. As a result of the carriage 6 moving in the left-right direction in a state in which the wiper 711 is in the contact posture shown in FIG. 4, the wiper 711 comes into contact with the nozzle surface 311 (not shown in the drawings). In this way, the wiper 711 wipes away the ink that has adhered to the nozzle surface 311 in the print control. In a similar manner, as a result of the carriage 6 moving in the left-right direction in a state in which the wiper 721 is in the contact posture shown in FIG. 4, the wiper 721 comes into contact with the nozzle surface 321 (not shown in the drawings). In this way, the wiper 721 wipes away the ink that has adhered to the nozzle surface 321 in the print control.

In the discharge flushing operation, the CPU 81 controls the main scanning motor 99 and the head drivers 301 and 302 shown in FIG. 12. First, the carriage 6 stops at the first flushing position shown in FIG. 9. In the state in which the carriage 6 is stopped at the first flushing position shown in FIG. 9, the discharge flushing operation is performed by the white head 31. After that, the carriage 6 stops at the second flushing position shown in FIG. 10. In the state in which the carriage 6 is stopped at the second flushing position shown in FIG. 10, the discharge flushing operation is performed by the white head 32. When the wiping operation and the discharge flushing operation end, the CPU 81 ends the maintenance operation.

The CPU 81 controls the main scanning motor 99 shown in FIG. 12 and moves the carriage 6 to the left from the second flushing position shown in FIG. 10 (step S34). On the basis of the determination result from the encoder 991 shown in FIG. 12, the CPU 81 determines whether the carriage 6 is positioned at the cap position shown in FIG. 6 (step S35).

When the carriage 6 is positioned further to the right than the cap position shown in FIG. 6 (no at step S35), the CPU 81 returns the processing to step S35. When the carriage 6 is positioned at the cap position shown in FIG. 6 (yes at step S35), the CPU 81 stops the driving of the main scanning motor 99 shown in FIG. 12 and stops the carriage 6 at the cap position shown in FIG. 6 (step S36).

The CPU 81 controls the cap motor 48 shown in FIG. 12 and moves the cap support portion 47 shown in FIG. 6 upward (step S37). In this way, as shown in FIG. 5, the caps 41 and 42 adhere closely, from below, to the nozzle surfaces 311 and 321 respectively. In other words, the caps 41 and 42 are caused to perform the capping, from the uncapping state shown in FIG. 6 to the capping state shown in FIG. 5. The CPU 81 ends the main processing.

An example will be described of the effects and advantages according to the above-described embodiment. Hereinafter, of the white heads 31 and 32 and the color heads 33 and 34, the discharge flushing operation by the white head 31 will be mainly described, but the printer 1 achieves the same effects and advantages, by the discharge flushing operation by the white head 32 and the color heads 33 and 34, as the discharge flushing operation by the white head 31. The amount of ink discharged from the white head 31 by the discharge flushing operation is referred to as a "flushing amount."

For example, the flushing amount per unit of time is limited by a number of the nozzles 313, an area of the nozzles 313, a drive force by the head driver 301, and the like. Thus, when the flushing amount increases, a maximum value of the flushing amount per unit of time does not change, and thus, a time period required for the discharge flushing operation as a whole becomes longer. For example, in the discharge flushing operation by the processing at step S23, if a movement velocity of the white head 31 is fast when the white head 31 passes from the left to the right over the receiver 512, the time it takes for the white head 31 to pass from the left to the right over the receiver 512 during the discharge flushing operation by the processing at step S23 is shorter.

For example, when the flushing amount is large, there is a case in which the movement velocity of the white head 31 is fast when the white head 31 passes from the left to the right over the receiver 512. If, for example, the time required for the discharge flushing operation as a whole exceeds the time it take for the white head 31 to pass from the left to the right over the receiver 512 during the discharge flushing operation by the processing at step S23, there is a possibility that the ink discharged from the white head 31 by the discharge flushing operation may land outside the flushing box 51. In the above-described embodiment, due to a configuration described below, the printer 1 can reduce the possibility of the ink discharged from the white head 31 by the discharge flushing operation at step S23 from landing outside the flushing box 51, while speeding up the discharge flushing operation at step S23.

The printer 1 is provided with the white head 31, the flushing box 51, the cap 41, and the CPU 81. The white head 31 moves in the main scanning direction (the left-right direction). The nozzle surface 311 is provided at the white head 31. The nozzle surface 311 intersects the up-down direction. The flushing box 51 is provided below the movement path of the white head 31 in the main scanning direction (the left-right direction). The cap 41 is provided to the left of the flushing box 51, and can adhere closely to the nozzle surface 311. In the discharge flushing operation at step S13, the CPU 81 discharges the ink from the white head 31 toward the cap 41. In the discharge flushing operation at step S23, the CPU 81 discharges the ink toward the flushing box 51 while moving the white head 31 in the main scanning direction (the left-right direction).

According to this configuration, the discharge flushing operation at step S23 is performed by the white head 31 while the white head 31 is moving in the main scanning direction (the left-right direction). Thus, the printer 1 can speed up the discharge flushing operation at step S23. Furthermore, in addition to the discharge flushing operation at step S23, the ink is also discharged from the white head 31 in the discharge flushing operation at step S13. In this way, the printer 1 can divide the flushing amount between the discharge flushing operation at step S13 and the discharge flushing operation at step S23. As a result, the printer 1 can suppress the flushing amount by the processing at step S23 from increasing, compared to a case in which the discharge flushing operation is not performed at step S13. Thus, while speed up the discharge flushing operation at step S23, the printer 1 can suppress the increase in the flushing amount in relation to the time for the white head 31 to pass over the flushing box 51 during the discharge flushing operation at step S23. Thus, while speeding up the discharge flushing operation at step S23, the printer 1 can reduce the possibility of the ink discharged from the white head 31 by the discharge flushing operation at step S23 from landing outside the flushing box 51.

The CPU 81 performs the discharge flushing operation at step S23 after the discharge flushing operation at step S13. After the discharge flushing operation at step S23, in the print control at step S32, the CPU 81 discharges the ink onto the print medium M from the white head 31 while moving the white head 31 in the main scanning direction (the left-right direction).

In this case, for example, compared to a case in which the discharge flushing operation at step S13 is performed after the discharge flushing operation at step S23 and step S25, and the print control at step S32 is performed thereafter, the printer 1 can reduce the time it takes from the start of one of the first discharge flushing operations at step S13, step S23 or step S25 to the start of the print control at step S32. Thus, while shortening the time required up to the start of the print control at step S32 after the discharge flushing operation at step S13, the printer 1 can reduce the possibility of the ink discharged from the white head 31 by the discharge flushing operation at step S23 from landing outside the flushing box 51.

The print medium M is placed on the platen 12. The cap 41 is positioned opposite to the platen 12 with respect the flushing box 51 in the main scanning direction (the left-right direction). In the uncapping operation at step S11, the CPU 81 separates the cap 41 downward from the nozzle surface 311, from the state in which the cap 41 is adhered closely to the nozzle surface 311. After the uncapping operation at step S11, the CPU 81 performs the discharge flushing operation at step S13 and step S23.

In this case, in the main scanning direction (the left-right direction), the cap 41 is positioned opposite to the platen 12 with respect to the flushing box 51. Thus, after the uncapping operation at step S11, the printer 1 can perform the discharge flushing operation at step S13 and the discharge flushing operation at step S23, without moving the white head 31 in the direction of separating from the platen 12 from the right to the left. In this way, after the discharge flushing operation at step S13, the printer 1 can further shorten the time required up to the start of the print control at step S32. Thus, while further shortening the time required up to the start of the print control at step S32 after the discharge flushing operation at step S13, the printer 1 can reduce the possibility of the ink discharged from the white head 31 by the discharge flushing operation at step S23 from landing outside the flushing box 51.

The CPU 81 performs the discharge flushing operation at step S13 in the state in which the cap 41 is separated downward from the nozzle surface 311.

In this case, the distance from the nozzle surface 311 to the cap 41 is greater than a state in which the cap 41 is adhered closely to the nozzle surface 311. Thus, even if the ink discharged from the white head 31 by the discharge flushing operation at step S13 is caused to rebound by the cap 41, the printer 1 can suppress the ink that has rebounded due to the cap 41 from adhering to the nozzle surface 311. In this way, the printer 1 can suppress the ink discharge failure due to the ink that has rebounded being adhered to the nozzle surface 311, for example. Furthermore, the color heads 33 and 34 discharge the color inks of the plurality of colors from each of the nozzle rows 332 and 342, for example. The printer 1 can suppress color mixing resulting from the color inks that have rebounded entering into the nozzles 333 and 343.

The CPU 81 performs the discharge flushing operation at step S13 while moving the cap 41 downward. After the discharge flushing operation at step S13, the CPU 81 performs the discharge flushing operation at step S23.

In this case, in comparison to a case in which the discharge flushing operation at step S13 is performed after the downward movement of the cap 41 is complete, in other words, after the uncapping operation at step S16 has ended, the printer 1 can shorten the time from the start of the downward movement of the cap 41, namely, the start of the uncapping operation at step S11, to the discharge flushing operation at step S23.

The waste liquid flow passage 91 is connected to the cap 41. The pump 911 is provided at the waste liquid flow passage 91. In the capping operation at step S37, the CPU 81 causes the cap 41 to adhere closely to the nozzle surface 311, from the state in which the cap 41 is separated downward. In the processing at step S21, the CPU 81 drives the pump 911 after the discharge flushing operation at step S13, and before the capping operation at step S37.

In this case, in the processing at step S37, when the cap 41 is adhered closely to the nozzle surface 311 after the discharge flushing operation at step S13, the printer 1 can suppress the ink inside the cap 41 from adhering to the nozzle surface 311.

Furthermore, in the processing at step S16, the printer 1 eliminates the ink discharged into the cap 41 by the discharge flushing operation at step S13 from inside the cap 41 via the waste liquid flow passage 91, during the movement of the carriage 6 started at step S14. In other words, the printer 1 performs the processing at step S16 while performing the other processing. Thus, the printer 1 can suppress a lengthening of time required for performing the main processing as a whole, compared to a case in which the processing at step S16 is performed at a different time period from the other processing. Note that the other processing is not limited to the movement of the carriage 6 started at step S14, and may be the print control at step S32, the maintenance operation at step S33, and the like. In other words, in place of the processing at step S21 and step S26, the CPU 81 may, for example, start the driving of the pump 911 after starting the print control at step S32, and may stop the driving of the pump 911 before the end of the print control. Note that some of a period from starting to stopping the driving of the pump 911 may overlap with a period of executing the other processing.

The present disclosure can be changed from the above-described embodiment. Various modified examples to be described below can be combined insofar as no contradictions occur. For example, the printer 1 can change the arrangement positions of the plurality of heads 3 as appropriate. The printer 1 may omit one to three of any of the white heads 31 and 32 and the color heads 33 and 34, or may be provided with five or more of the heads 3. For example, when the printer 1 is provided with only the white head 31, of the white heads 31 and 32 and the color heads 33 and 34, in the main processing, the processing at step S24 and step S25 is omitted.

The CPU 81 may identify each of the positions of the carriage 6, namely, the first flushing position, the second flushing position, and the cap position, on the basis of a detection result from a sensor such as a switch sensor, an optical sensor, or the like, in place of the detection result from the encoder 991. In this case, the sensor is, for example, provided at each of the positions of the carriage 6, such as the first flushing position, the second flushing position, and the cap position. The CPU 81 may identify each of the positions of the cap support portion 47, such as the lowered position or the like, on the basis of a detection result from a sensor such as a switch sensor, an optical sensor, or the like, in place of the detection result from the encoder 481. In this case, the sensor is, for example, provided at each of the positions of the cap support portion 47, such as the lowered position and the like.

In the above-described embodiment, the CPU 81 controls the execution time period of the non-discharge flushing operation at step S12 on the basis of the non-discharge flushing operation time period, and controls the execution time period of the discharge flushing operation at step S13 on the basis of the discharge flushing operation time period. In contrast to this, the CPU 81 may control the execution time period of the non-discharge flushing operation at step S12 and the execution time period of the discharge flushing operation at step S13 on the basis of a position, in the up-down direction, of the cap support portion 47, and a position, in the left-right direction, of the carriage 6.

The printer 1 may be provided with a paper cassette and a conveyance member and may fix a medium support portion at a position lower than the carriage 6 in the printing region 18. A plurality of sheets of paper are set in the paper cassette as the print medium M. The conveyance member is a roller, for example. In this case, the printer 1 conveys the sheet of paper from the paper cassette onto the medium support portion by rotating the conveyance member. The printer 1 performs the printing, using the heads 3, on the sheet of paper conveyed onto the medium support portion.

The printer 1 may be provided with a medium holding portion and the conveyance member, and may fix the medium support portion at a position lower than the carriage 6 in the printing region 18. The medium holding portion holds a paper roll or fanfold paper. The paper roll is configured, as the print medium M, by sheets of paper connected in a roll shape. The conveyance member is the roller, for example. In this case, the printer 1 pulls out the sheet of paper from the paper roll or the fanfold paper, and conveys the sheet of paper onto the medium support portion. The printer 1 performs the printing, using the heads 3, on the sheet of paper conveyed onto the medium support portion.

The movement mechanisms of each of the heads 3 and the platen 12 are not limited to those of the above-described embodiment. For example, the heads 3 and the platen 12 may each be moved by a movement mechanism such as a roller, a ball screw, or the like.

The shape of the flushing boxes 51 and 52 is not limited to that of the above-described embodiment. For example, the printer 1 may be provided with a plate in place of the flushing boxes 51 and 52. The plate extends, in the non-printing region 19, in the front-rear direction and in the left-right direction below the movement path of the heads 3. In this case, the receivers 512 and 522 are formed in the upper surface of the plate.

In the above-described embodiment, the printer 1 is provided with the two flushing boxes 51 and 52 with respect to the four heads 3. In contrast to this, the printer 1 may be provided with the single flushing box with respect to the four heads 3. In other words, the receivers 512 and 522 may be connected to each other. The printer 1 may be provided with four of the flushing boxes with respect to the four heads 3.

The printer 1 can change, as appropriate, the arrangement positions of the flushing box 51, the caps 41 and 42, the wipers 711 and 721, and the platen 12 in the left-right direction. For example, the flushing box 51 may be positioned further to the left than the caps 41 and 42. In this case, the platen 12 may be positioned further to the left than the flushing box 51. The flushing box 51 may be positioned between the wipers 711 and 721 and the caps 41 and 42 in the left-right direction, or the flushing box 51 may be positioned further to the right than the platen 12. Either the caps 41 and 42 or the wipers 711 and 721, or both the caps 41 and 42 and the wipers 711 and 721 may be positioned further to the right than the platen 12. The wipers 711 and 721 may be positioned further to the left than the caps 41 and 42. In a similar manner, the printer 1 may change, as appropriate, the arrangement positions of the flushing box 52, the caps 43 and 44, the wipers 731 and 741, and the platen 12 in the left-right direction.

In the above-described embodiment, in the processing at step S23, the CPU 81 identifies the at least one nozzle row 312 facing the receiver 512 in the up-down direction, of the plurality of nozzle rows 312 in the white head 31, and causes the discharge flushing operation to be performed in the identified at least one nozzle row 312. In contrast to this, when, in the processing at step S23, the CPU 81 determines that all of the plurality of nozzle rows 312 in the white head 31 are facing the receiver 512 in the up-down direction, the CPU 81 may cause the discharge flushing operation to be performed in all of the plurality of nozzle rows 312. In other words, in the above-described embodiment, in contrast to the first flushing position being the position of the carriage 6 when at least some of the plurality of nozzle rows 312 in the white head 31 face the receiver 512 in the up-down direction, the first flushing position may be the position of the carriage 6 when all of the plurality of nozzle rows 312 face the receiver 512 in the up-down direction. The printer 1 can also change the processing at step S25 and the second flushing position, in a similar manner to the processing at step S23 and the first flushing position.

The CPU 81 may start the discharge flushing operation by the head 3 at step S13 after starting the uncapping operation and before the caps 41 and 42 enter into the uncapping state. In place of, or in addition to the processing (step S13) in which the CPU 81 causes the head 3 to perform the discharge flushing operation after the start of the uncapping operation, the CPU 81 may cause the head 3 to perform the discharge flushing operation before the start of the uncapping operation, namely, in the uncapping state. In this case, the CPU 81 may start the uncapping operation during the execution of the discharge flushing operation by the head 3, or may start the uncapping operation after the end of the discharge flushing operation by the head 3.

In the above-described embodiment, the CPU 81 causes the head 3 to perform the discharge flushing operation at step S13 while moving the caps 41 and 42 downward. In contrast to this, the CPU 81 may cause the head 3 to perform the discharge flushing operation at step S13 in a state in which the caps 41 and 42 are stopped, such as a state in which the cap support portion 47 is stopped at the intermediate position, for example. The CPU 81 may stand by until the caps 41 and 42 are in the uncapping state, without causing the head 3 to perform the non-discharge flushing operation at step S12.

In the above-described embodiment, the CPU 81 ends the discharge flushing operation by the head 3 at step S13 before starting the movement to the right of the carriage 6. In contrast to this, the CPU 81 may continue to execute the discharge flushing operation by the head 3 by the processing at step S13 even after the movement to the right of the carriage 6 has started. Immediately after the start of the movement of the carriage 6 by the processing at step 14, the holders 412 and 422 track the white heads 31 and 32 while being in contact with the white heads 31 and 32. In other words, immediately after the start of the movement of the carriage 6 by the processing at step S14, the state of the white heads 31 and 32 and the caps 41 and 42 facing each other in the up-down direction is maintained. Thus, it is sufficient that the CPU 81 end the discharge flushing operation by the plurality of heads 3 by the processing at step S13 until the white heads 31 and 32 separate, to the right, from the holders 412 and 422, for example.

In the above-described embodiment, at step S23 or step S25, the CPU 81 causes the white head 31 or the white head 32 to perform the discharge flushing operation toward the flushing box 51, while moving the carriage 6 from the left to the right, namely, moving the carriage 6 in a direction from the caps 41 and 42 toward the flushing box 51. In contrast to this, the CPU 81 may cause the white head 31 or the white head 32 to perform the discharge flushing operation toward the flushing box 51, while moving the carriage 6 from the right to the left, namely, moving the carriage 6 in a direction from the flushing box 51 toward the caps 41 and 42. For example, in the maintenance operation at step S33 after the print control by the processing at step S32, when the carriage 6 is positioned at the first flushing position or the second flushing position, the CPU 81 may cause the white head 31 or the white head 32 to perform the discharge flushing operation toward the flushing box 51 while moving the carriage 6. In this case, in the maintenance operation at step S33, for example, while moving the carriage 6 from the right to the left, the CPU 81 may cause the white head 32 to perform the discharge flushing operation toward the receiver 512 when the carriage 6 is positioned at the second flushing position, and after that, may cause the white head 31 to perform the discharge flushing operation toward the receiver 512 when the carriage 6 is positioned at the first flushing position. Furthermore, in this case, after causing the discharge flushing operation by the white heads 31 and 32 to the receiver 512, either before or after the capping operation at step S37, the CPU 81 may cause the white heads 31 and 32 to perform the discharge flushing operation toward the caps 41 and 42. In the maintenance operation, when the white heads 31 and 32 are caused to perform the discharge flushing operation toward the receiver 512 while moving the carriage 6 in the left-right direction, the CPU 81 may omit the wiping operation.

In the above-described embodiment, the discharge direction by the heads 3 is the downward direction, and thus, each of the nozzle surfaces 311, 321, 331, and 341 is orthogonal to the discharge direction by the heads 3. In contrast to this, as long as the nozzle surfaces 311, 321, 331, and 341 extend so as to intersect the discharge direction by the heads 3, they need not necessarily be orthogonal to the discharge direction by the heads 3. For example, when the nozzle surfaces 311, 321, 331, and 341 extends in the front-rear direction and the left-right direction, the heads 3 may, for example, discharge the ink diagonally downward and to the left. For example, in a front view, the nozzle surfaces 311, 321, 331 and 341 may extend in one direction in the up-down direction the further they extend in one direction in the left-right direction. In this case, the heads 3 may discharge the ink in a direction orthogonal to the nozzle surfaces 311, 321, 331, and 341, for example. In this case, the discharge direction by the heads 3 intersects the main scanning direction without being orthogonal to the main scanning direction. Furthermore, in this case, the receivers 512 and 522 may extend so as to be orthogonal to the discharge direction by the heads 3.

The configuration of the cap unit 411 is not limited to that of the above-described embodiment. For example, the cap unit 411 may omit the holder 412. In this case, the cap 41 may be directly fixed to the cap support portion 47, or may be fixed to the cap support portion 47 via the compression spring 418. The cap unit 411 may be provided with an elastic member, such as another spring, rubber, sponge or the like, in place of the tension spring 415 and the compression spring 418. For example, the cap unit 411 may urge the holder 412 to the right from the left of the holder 412, using a compression spring in place of the tension spring 415. The printer 1 can also change the configuration of the cap units 421, 431, and 441, in a similar manner to the cap unit 411.

After the discharge flushing operation at step S13, before the capping operation at step S37, the CPU 81 need not necessarily drive the pump 911 each time in the processing at step S21. For example, each time the main processing is performed a plurality of times, after the discharge flushing operation at step S13, before the capping operation at step S37, the CPU 81 may drive the pump 911 in the processing at step S21.

In the above-described embodiment, at step S11, it is sufficient that the CPU 81 separate the caps 41 to 44 at least downward from the nozzle surfaces 311, 321, 331, and 341. For example, the caps 41 to 44 may be separated from the nozzle surfaces 311, 321, 331, and 341 by moving the caps 41 to 44 diagonally to the left, to the right, to the front, or to the rear the more the caps 41 to 44 move in the downward direction. The caps 41 to 44 may be moved from the capping state to the uncapping state by the carriage 6 moving in the up-down direction with respect to the caps 41 to 44.

In place of the CPU 81, a microcomputer, application specific integrated circuits (ASICs), a field programmable gate array (FPGA) or the like may be used as a processor. The main processing may be performed as distributed processing by a plurality of the processors. It is sufficient that the non-transitory storage media, such as the ROM 82, the flash memory 84, and the like be a storage medium capable of storing information, regardless of a period of storing the information. The non-transitory storage medium need not necessarily include a transitory storage medium (a transmitted signal, for example). The control program may be downloaded from a server connected to a network (not shown in the drawings) (in other words, may be transmitted as transmission signals), and may be stored in the ROM 82 or the flash memory 84. In this case, the control program may be stored in a non-transitory storage medium, such as an HDD provided in the server.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A printer comprising:

a head provided with a nozzle surface intersecting a discharge direction, the head being configured to print an image on a print medium by discharging ink onto the print medium and being configured to move in a main scanning direction intersecting the discharge direction;

a flushing receiving member positioned in the discharge direction with respect to a movement path of the head in the main scanning direction, the flushing receiving member being a member different from the print medium;

a cap configured to closely adhere to the nozzle surface, the cap and the flushing receiving member being arranged in the main scanning direction;

a processor; and a memory storing computer-readable instructions that, when executed by the processor, instruct the processor to perform processes comprising:

performing flushing processing including a first flushing operation of discharging the ink from the head toward the cap, and a second flushing operation of discharging the ink toward the flushing receiving member, and performing print processing, after the flushing processing, of discharging the ink from the head onto the print medium while moving the head in the main scanning direction.

2. The printer according to claim 1, wherein the computer-readable instructions stored in the memory further instruct the processor to perform a process comprising:

performing the first flushing operation and the second flushing operation of the flushing processing, and the print processing in an order of the first flushing operation, the second flushing operation, and the print processing.

3. The printer according to claim 2, wherein
the flushing receiving member is positioned between the cap and a platen in the main scanning direction, the platen being on which the print medium is placed, and
the computer-readable instructions stored in the memory further instruct the processor to perform processes comprising:
performing uncapping processing of separating the cap from the nozzle surface in the discharge direction, from a state of the cap being closely adhered to the nozzle surface, and
performing the flushing processing after the uncapping processing.

4. The printer according to claim 1, wherein
the computer-readable instructions stored in the memory further instruct the processor to perform a process comprising:
performing the first flushing operation, in the flushing processing, in a state of the cap being separated from the nozzle surface in the discharge direction.

5. The printer according to claim 4, wherein
the computer-readable instructions stored in the memory further instruct the processor to perform a process comprising:
in the flushing processing, performing the first flushing operation while moving the cap in the discharge direction, and performing the second flushing operation after the first flushing operation.

6. The printer according to claim 1, wherein
the computer-readable instructions stored in the memory further instruct the processor to perform processes comprising:
performing capping processing of causing the cap to closely adhere to the nozzle surface, from a state of the cap being separated from the nozzle surface in the discharge direction; and
performing pump processing of driving a pump, after the first flushing operation by the flushing processing and before the capping processing, the pump being provided at a waste liquid flow passage connected to the cap.

7. A control method of a printer including a head provided with a nozzle surface intersecting a discharge direction, the head being configured to print an image on a print medium by discharging ink onto the print medium and being configured to move in a main scanning direction intersecting the discharge direction, a flushing receiving member positioned in the discharge direction with respect to a movement path of the head in the main scanning direction, the flushing receiving member being a member different from the print medium, and a cap configured to closely adhere to the nozzle surface, the cap and the flushing receiving member being arranged in the main scanning direction, the control method comprising:
performing flushing processing including a first flushing operation of discharging the ink from the head toward the cap, and a second flushing operation of discharging the ink toward the flushing receiving member, and
performing print processing, after the flushing processing, of discharging the ink from the head onto the print medium while moving the head in the main scanning direction.

8. A non-transitory computer-readable medium storing computer-readable instructions that, when executed by a computer of a printer that includes a head provided with a nozzle surface intersecting a discharge direction, the head being configured to print an image on a print medium by discharging ink onto the print medium and being configured to move in a main scanning direction intersecting the discharge direction, a flushing receiving member positioned in the discharge direction with respect to a movement path of the head in the main scanning direction, the flushing receiving member being a member different from the print medium, and a cap configured to closely adhere to the nozzle surface, the cap and the flushing receiving member being arranged in the main scanning direction, cause the computer to perform processes comprising:
performing flushing processing including a first flushing operation of discharging the ink from the head toward the cap, and a second flushing operation of discharging the ink toward the flushing receiving member, and
performing print processing, after the flushing processing, of discharging the ink from the head onto the print medium while moving the head in the main scanning direction.

* * * * *